United States Patent
VanGilder

(10) Patent No.: US 9,830,410 B2
(45) Date of Patent: Nov. 28, 2017

(54) SYSTEM AND METHOD FOR PREDICTION OF TEMPERATURE VALUES IN AN ELECTRONICS SYSTEM

(75) Inventor: James William VanGilder, Pepperell, MA (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 554 days.

(21) Appl. No.: 14/366,500

(22) PCT Filed: Dec. 22, 2011

(86) PCT No.: PCT/US2011/066776
§ 371 (c)(1),
(2), (4) Date: Jun. 18, 2014

(87) PCT Pub. No.: WO2013/095494
PCT Pub. Date: Jun. 27, 2013

(65) Prior Publication Data
US 2015/0025833 A1    Jan. 22, 2015

(51) Int. Cl.
*G06F 1/20*  (2006.01)
*G06F 17/50* (2006.01)
(Continued)

(52) U.S. Cl.
CPC .......... *G06F 17/5009* (2013.01); *G01F 1/708* (2013.01); *G01K 7/427* (2013.01);
(Continued)

(58) Field of Classification Search
USPC ....................................................... 702/136
See application file for complete search history.

(56) References Cited

U.S. PATENT DOCUMENTS 1,025,243 A   5/1912  Carpenter et al.
1,941,258 A   12/1933 Gordon
(Continued)

FOREIGN PATENT DOCUMENTS

CN   1485906 A   3/2004
CN   2612211 Y   4/2004
(Continued)

OTHER PUBLICATIONS

"Optimizing facility operation in high density data center environments," 2007, Hewlett-Packard Development Company, pp. 1-25.
(Continued)

*Primary Examiner* — Paul D Lee
(74) *Attorney, Agent, or Firm* — Lando & Anastasi, LLP

(57) ABSTRACT

In accordance with at least one embodiment, a computer-implemented method for evaluating cooling performance of an electronics system is provided. The method includes acts of dividing the electronics system into a computational grid including a plurality of fluid cells and a plurality of solid cells, determining air flow values for the plurality of fluid cells using a potential flow model analysis, determining a temperature of a fluid cell by calculating heat transfer into the fluid cell from any adjacent fluid cells and from any adjacent solid cells, determining a temperature of a solid cell by calculating heat transfer into the solid cell from any adjacent solid cells and heat transfer out of the solid cell into any adjacent fluid cells, and storing, on a storage device, the air flow values and the temperature of the fluid cell and the temperature of the solid cell.

20 Claims, 7 Drawing Sheets

(51) Int. Cl.
  *H05K 7/20* (2006.01)
  *G01F 1/708* (2006.01)
  *G01K 7/42* (2006.01)
(52) U.S. Cl.
  CPC ............ *G06F 1/20* (2013.01); *G06F 17/5004* (2013.01); *G06F 17/5018* (2013.01); *H05K 7/20836* (2013.01); *G06F 2217/80* (2013.01)

(56) References Cited

U.S. PATENT DOCUMENTS

| | | |
|---|---|---|
| 2,455,022 A | 11/1948 | Schmidt |
| 3,317,798 A | 5/1967 | Chu et al. |
| 3,559,728 A | 2/1971 | Lyman et al. |
| 3,643,007 A | 2/1972 | Roberts et al. |
| 3,681,936 A | 8/1972 | Park |
| 3,742,725 A | 7/1973 | Berger |
| 3,995,446 A | 12/1976 | Eubank |
| 4,055,053 A | 10/1977 | Elfving et al. |
| 4,127,008 A | 11/1978 | Tyree, Jr. |
| 4,197,716 A | 4/1980 | Nussbaum |
| 4,223,535 A | 9/1980 | Kumm |
| 4,275,570 A | 6/1981 | Szymaszek et al. |
| 4,285,205 A | 8/1981 | Martin et al. |
| 4,419,865 A | 12/1983 | Szymaszek |
| 4,515,746 A | 5/1985 | Brun et al. |
| 4,564,767 A | 1/1986 | Charych |
| 4,590,538 A | 5/1986 | Cray, Jr. |
| 4,599,873 A | 7/1986 | Hyde |
| 4,673,826 A | 6/1987 | Masson |
| 4,683,529 A | 7/1987 | Bucher, II |
| 4,696,168 A | 9/1987 | Woods et al. |
| 4,718,249 A | 1/1988 | Hanson |
| 4,747,041 A | 5/1988 | Engel et al. |
| 4,774,631 A | 9/1988 | Okuyama et al. |
| 4,816,982 A | 3/1989 | Severinsky |
| 4,823,247 A | 4/1989 | Tamoto |
| 4,823,290 A | 4/1989 | Fasack et al. |
| 4,827,151 A | 5/1989 | Okado |
| 4,827,733 A | 5/1989 | Dinh |
| 4,831,508 A | 5/1989 | Hunter |
| 4,837,663 A | 6/1989 | Zushi et al. |
| 4,911,231 A | 3/1990 | Horne et al. |
| 4,937,505 A | 6/1990 | Deglon et al. |
| 4,944,158 A | 7/1990 | Akiike et al. |
| 4,962,734 A | 10/1990 | Jorgensen |
| 4,964,029 A | 10/1990 | Severinsky et al. |
| 4,980,812 A | 12/1990 | Johnson, Jr. et al. |
| 5,017,800 A | 5/1991 | Divan |
| 5,019,717 A | 5/1991 | McCurry et al. |
| 5,047,913 A | 9/1991 | De Doncker et al. |
| 5,057,968 A | 10/1991 | Morrison |
| 5,095,712 A | 3/1992 | Narreau |
| 5,097,328 A | 3/1992 | Boyette |
| 5,126,585 A | 6/1992 | Boys |
| 5,150,580 A | 9/1992 | Hyde |
| 5,153,837 A | 10/1992 | Shaffer et al. |
| 5,158,132 A | 10/1992 | Guillemot |
| 5,168,724 A | 12/1992 | Gilbertson et al. |
| 5,173,819 A | 12/1992 | Takahashi et al. |
| 5,177,666 A | 1/1993 | Bland et al. |
| 5,181,653 A | 1/1993 | Foster et al. |
| 5,184,025 A | 2/1993 | McCurry et al. |
| 5,195,706 A | 3/1993 | Allen |
| 5,216,623 A | 6/1993 | Barrett et al. |
| 5,234,185 A | 8/1993 | Hoffman et al. |
| 5,269,372 A | 12/1993 | Chu et al. |
| 5,367,670 A | 11/1994 | Ward et al. |
| 5,381,554 A | 1/1995 | Langer et al. |
| 5,382,943 A | 1/1995 | Tanaka |
| 5,388,422 A | 2/1995 | Hayashida et al. |
| 5,404,136 A | 4/1995 | Marsden |
| 5,410,448 A | 4/1995 | Barker, III et al. |
| 5,462,225 A | 10/1995 | Massara et al. |
| 5,507,529 A | 4/1996 | Martins |
| 5,519,306 A | 5/1996 | Itoh et al. |
| 5,528,507 A | 6/1996 | McNamara et al. |
| 5,533,357 A | 7/1996 | Voorhis |
| 5,572,873 A | 11/1996 | Lavigne et al. |
| 5,581,478 A | 12/1996 | Cruse et al. |
| 5,582,020 A | 12/1996 | Scaringe et al. |
| 5,602,462 A | 2/1997 | Stich et al. |
| 5,649,428 A | 7/1997 | Calton et al. |
| 5,654,591 A | 8/1997 | Mabboux et al. |
| 5,657,641 A | 8/1997 | Cunningham et al. |
| 5,682,949 A | 11/1997 | Ratcliffe et al. |
| 5,684,686 A | 11/1997 | Reddy |
| 5,694,780 A | 12/1997 | Alsenz |
| 5,704,219 A | 1/1998 | Suzuki et al. |
| 5,718,628 A | 2/1998 | Nakazato et al. |
| 5,735,134 A | 4/1998 | Liu et al. |
| 5,749,237 A | 5/1998 | Sandofsky et al. |
| 5,794,897 A | 8/1998 | Jobin et al. |
| 5,802,856 A | 9/1998 | Schaper et al. |
| 5,845,090 A | 12/1998 | Collins, III et al. |
| 5,850,539 A | 12/1998 | Cook et al. |
| 5,860,012 A | 1/1999 | Luu |
| 5,860,280 A | 1/1999 | Recine, Sr. et al. |
| 5,896,922 A | 4/1999 | Chrysler et al. |
| 5,923,103 A | 7/1999 | Pulizzi et al. |
| 5,949,974 A | 9/1999 | Ewing et al. |
| 5,953,930 A | 9/1999 | Chu et al. |
| 5,954,127 A | 9/1999 | Chrysler et al. |
| 5,959,240 A | 9/1999 | Yoshida et al. |
| 5,960,204 A | 9/1999 | Yinger et al. |
| 5,963,425 A | 10/1999 | Chrysler et al. |
| 5,963,457 A | 10/1999 | Kanoi et al. |
| 5,968,398 A | 10/1999 | Schmitt et al. |
| 5,970,731 A | 10/1999 | Hare et al. |
| 5,970,734 A | 10/1999 | Stillwell et al. |
| 5,972,196 A | 10/1999 | Murphy et al. |
| 5,974,237 A | 10/1999 | Shurmer et al. |
| 5,978,594 A | 11/1999 | Bonnell et al. |
| 5,978,912 A | 11/1999 | Rakavy et al. |
| 5,982,652 A | 11/1999 | Simonelli et al. |
| 5,984,144 A | 11/1999 | Wyatt |
| 5,987,614 A | 11/1999 | Mitchell et al. |
| 5,995,729 A | 11/1999 | Hirosawa et al. |
| 6,023,935 A | 2/2000 | Okazaki et al. |
| 6,032,472 A | 3/2000 | Heinrichs et al. |
| 6,034,872 A | 3/2000 | Chrysler et al. |
| 6,038,879 A | 3/2000 | Turcotte et al. |
| 6,046,920 A | 4/2000 | Cazabat et al. |
| 6,055,480 A | 4/2000 | Nevo et al. |
| 6,069,412 A | 5/2000 | Raddi et al. |
| 6,085,243 A | 7/2000 | Fletcher et al. |
| 6,088,225 A | 7/2000 | Parry et al. |
| 6,104,868 A | 8/2000 | Peters et al. |
| 6,105,061 A | 8/2000 | Nakai |
| 6,108,782 A | 8/2000 | Fletcher et al. |
| 6,111,036 A | 8/2000 | Wonders et al. |
| 6,112,235 A | 8/2000 | Spofford |
| 6,134,511 A | 10/2000 | Subbarao |
| 6,141,762 A | 10/2000 | Nicol et al. |
| 6,189,109 B1 | 2/2001 | Sheikh et al. |
| 6,191,500 B1 | 2/2001 | Toy |
| 6,199,204 B1 | 3/2001 | Donohue |
| 6,201,371 B1 | 3/2001 | Kawabe et al. |
| 6,208,510 B1 | 3/2001 | Trudeau et al. |
| 6,209,330 B1 | 4/2001 | Timmerman et al. |
| 6,213,194 B1 | 4/2001 | Chrysler et al. |
| 6,215,287 B1 | 4/2001 | Matsushiro et al. |
| 6,216,482 B1 | 4/2001 | Xiao et al. |
| 6,216,956 B1 | 4/2001 | Ehlers et al. |
| 6,223,810 B1 | 5/2001 | Chu et al. |
| 6,237,353 B1 | 5/2001 | Sishtla et al. |
| 6,246,969 B1 | 6/2001 | Sinclair et al. |
| 6,266,721 B1 | 7/2001 | Sheikh et al. |
| 6,276,161 B1 | 8/2001 | Peiffer et al. |
| 6,281,790 B1 | 8/2001 | Kimmel et al. |
| 6,305,180 B1 | 10/2001 | Miller et al. |
| 6,327,143 B1 | 12/2001 | Bonstrom et al. |
| 6,330,176 B1 | 12/2001 | Thrap et al. |
| 6,332,202 B1 | 12/2001 | Sheikh et al. |

(56) References Cited

U.S. PATENT DOCUMENTS

| | | |
|---|---|---|
| 6,332,335 B1 | 12/2001 | Kajimoto et al. |
| 6,347,627 B1 | 2/2002 | Frankie et al. |
| 6,363,421 B2 | 3/2002 | Barker et al. |
| 6,374,627 B1 | 4/2002 | Schumacher et al. |
| 6,381,700 B1 | 4/2002 | Yoshida |
| 6,389,464 B1 | 5/2002 | Krishnamurthy et al. |
| 6,400,591 B2 | 6/2002 | Reilly et al. |
| 6,415,628 B1 | 7/2002 | Ahmed et al. |
| 6,438,978 B1 | 8/2002 | Bessler |
| 6,457,076 B1 | 9/2002 | Cheng et al. |
| 6,459,579 B1 | 10/2002 | Farmer et al. |
| 6,474,087 B1 | 11/2002 | Lifson |
| 6,483,730 B2 | 11/2002 | Johnson, Jr. |
| 6,494,050 B2 | 12/2002 | Spinazzola et al. |
| 6,557,624 B1 | 5/2003 | Stahl et al. |
| 6,574,104 B2 | 6/2003 | Patel et al. |
| 6,575,234 B2 | 6/2003 | Nelson |
| 6,639,383 B2 | 10/2003 | Nelson et al. |
| 6,640,889 B1 | 11/2003 | Harte et al. |
| 6,661,678 B2 | 12/2003 | Raddi et al. |
| 6,662,576 B1 | 12/2003 | Bai |
| 6,668,565 B1 | 12/2003 | Johnson et al. |
| 6,672,955 B2 | 1/2004 | Charron |
| 6,682,100 B2 | 1/2004 | Wood et al. |
| 6,694,759 B1 | 2/2004 | Bash et al. |
| 6,695,577 B1 | 2/2004 | Susek |
| 6,711,264 B1 | 3/2004 | Matsumoto et al. |
| 6,714,977 B1 | 3/2004 | Fowler et al. |
| 6,718,277 B2 | 4/2004 | Sharma |
| 6,718,781 B2 | 4/2004 | Freund et al. |
| 6,721,672 B2 | 4/2004 | Spitaels et al. |
| 6,728,119 B2 | 4/2004 | Reilly et al. |
| 6,737,840 B2 | 5/2004 | McDonald et al. |
| 6,745,579 B2 | 6/2004 | Spinazzola et al. |
| 6,745,590 B1 | 6/2004 | Johnson et al. |
| 6,757,185 B2 | 6/2004 | Rojas Romero |
| 6,761,212 B2 | 7/2004 | DiPaolo |
| 6,775,137 B2 | 8/2004 | Chu et al. |
| 6,795,928 B2 | 9/2004 | Bradley et al. |
| 6,804,616 B2 | 10/2004 | Bodas |
| 6,804,975 B2 | 10/2004 | Park |
| 6,814,134 B1 | 11/2004 | Pravda |
| 6,819,563 B1 | 11/2004 | Chu et al. |
| 6,827,142 B2 | 12/2004 | Winkler et al. |
| 6,829,630 B1 | 12/2004 | Pajak et al. |
| 6,832,504 B1 | 12/2004 | Birkmann |
| 6,838,925 B1 | 1/2005 | Nielsen |
| 6,848,989 B2 | 2/2005 | Miyazaki et al. |
| 6,850,426 B2 | 2/2005 | Kojori et al. |
| 6,853,097 B2 | 2/2005 | Matsuda et al. |
| 6,853,564 B2 | 2/2005 | Kravitz |
| 6,859,366 B2 | 2/2005 | Fink |
| 6,859,882 B2 | 2/2005 | Fung |
| 6,862,179 B2 | 3/2005 | Beitelmal et al. |
| 6,880,349 B2 | 4/2005 | Johnson et al. |
| 6,881,142 B1 | 4/2005 | Nair |
| 6,886,353 B2 | 5/2005 | Patel et al. |
| 6,889,908 B2 | 5/2005 | Crippen et al. |
| 6,901,767 B2 | 6/2005 | Wood |
| 6,924,981 B2 | 8/2005 | Chu et al. |
| 6,927,980 B2 | 8/2005 | Fukuda et al. |
| 6,944,035 B2 | 9/2005 | Raddi et al. |
| 6,955,058 B2 | 10/2005 | Taras et al. |
| 6,959,558 B2 | 11/2005 | Bean, Jr. et al. |
| 6,964,539 B2 | 11/2005 | Bradley et al. |
| 6,967,283 B2 | 11/2005 | Rasmussen et al. |
| 6,967,841 B1 | 11/2005 | Chu et al. |
| 6,973,797 B2 | 12/2005 | Nemit, Jr. |
| 6,973,801 B1 | 12/2005 | Campbell et al. |
| 6,980,433 B2 | 12/2005 | Fink |
| 7,000,416 B2 | 2/2006 | Hirooka et al. |
| 7,000,467 B2 | 2/2006 | Chu et al. |
| 7,005,759 B2 | 2/2006 | Ying et al. |
| 7,012,807 B2 | 3/2006 | Chu et al. |
| 7,012,825 B2 | 3/2006 | Nielsen |
| 7,020,586 B2 | 3/2006 | Snevely |
| 7,031,870 B2 | 4/2006 | Sharma et al. |
| 7,032,119 B2 | 4/2006 | Fung |
| 7,033,267 B2 | 4/2006 | Rasmussen |
| 7,046,514 B2 | 5/2006 | Fink et al. |
| 7,047,300 B1 | 5/2006 | Oehrke et al. |
| 7,051,802 B2 | 5/2006 | Baer |
| 7,051,946 B2 | 5/2006 | Bash et al. |
| 7,065,600 B2 | 6/2006 | Papa et al. |
| 7,082,541 B2 | 7/2006 | Hammond et al. |
| 7,085,133 B2 | 8/2006 | Hall |
| 7,086,247 B2 | 8/2006 | Campbell et al. |
| 7,091,625 B2 | 8/2006 | Okusawa et al. |
| 7,104,081 B2 | 9/2006 | Chu et al. |
| 7,106,590 B2 | 9/2006 | Chu et al. |
| 7,112,131 B2 | 9/2006 | Rasmussen et al. |
| 7,120,021 B2 | 10/2006 | Hamman |
| 7,120,689 B2 | 10/2006 | Gonsalves et al. |
| 7,126,409 B2 | 10/2006 | Nielsen |
| 7,140,193 B2 | 11/2006 | Johnson et al. |
| 7,145,772 B2 | 12/2006 | Fink |
| 7,146,353 B2 | 12/2006 | Garg et al. |
| 7,148,796 B2 | 12/2006 | Joy et al. |
| 7,155,318 B2 | 12/2006 | Sharma et al. |
| 7,165,412 B1 | 1/2007 | Bean, Jr. |
| 7,173,820 B2 | 2/2007 | Fink et al. |
| 7,184,269 B2 | 2/2007 | Campbell et al. |
| 7,187,549 B2 | 3/2007 | Teneketges et al. |
| 7,197,433 B2 | 3/2007 | Patel et al. |
| 7,228,707 B2 | 6/2007 | Lifson et al. |
| 7,236,363 B2 | 6/2007 | Belady |
| 7,239,043 B2 | 7/2007 | Taimela et al. |
| 7,251,547 B2 | 7/2007 | Bash et al. |
| 7,254,307 B2 | 8/2007 | Xin |
| 7,259,963 B2 | 8/2007 | Germagian et al. |
| 7,270,174 B2 | 9/2007 | Chu et al. |
| 7,272,005 B2 | 9/2007 | Campbell et al. |
| 7,274,112 B2 | 9/2007 | Hjort et al. |
| 7,274,566 B2 | 9/2007 | Campbell et al. |
| 7,278,273 B1 | 10/2007 | Whiffed et al. |
| 7,284,379 B2 | 10/2007 | Pham et al. |
| 7,292,898 B2 | 11/2007 | Clark et al. |
| 7,293,666 B2 | 11/2007 | Mattlin et al. |
| 7,298,617 B2 | 11/2007 | Campbell et al. |
| 7,298,618 B2 | 11/2007 | Campbell et al. |
| 7,313,503 B2 | 12/2007 | Nakagawa et al. |
| 7,315,448 B1 | 1/2008 | Bash et al. |
| 7,319,594 B2 | 1/2008 | Nicolai et al. |
| 7,365,973 B2 | 4/2008 | Rasmussen et al. |
| 7,366,632 B2 | 4/2008 | Hamann et al. |
| 7,378,165 B2 | 5/2008 | Brignone et al. |
| 7,402,921 B2 | 7/2008 | Ingemi et al. |
| 7,403,391 B2 | 7/2008 | Germagian et al. |
| 7,406,839 B2 | 8/2008 | Bean et al. |
| 7,418,825 B1 | 9/2008 | Bean, Jr. |
| 7,421,575 B2 | 9/2008 | Ang et al. |
| 7,426,453 B2 | 9/2008 | Patel et al. |
| 7,462,453 B2 | 12/2008 | Yamada et al. |
| 7,472,043 B1 | 12/2008 | Low et al. |
| 7,558,649 B1 | 7/2009 | Sharma et al. |
| 7,568,360 B1 | 8/2009 | Bash et al. |
| 7,596,476 B2 | 9/2009 | Rasmussen et al. |
| 7,606,760 B2 | 10/2009 | Hutchison et al. |
| 7,620,480 B2 | 11/2009 | Patel et al. |
| 7,657,347 B2 | 2/2010 | Campbell et al. |
| 7,676,280 B1 | 3/2010 | Bash et al. |
| 7,681,404 B2 | 3/2010 | Bean, Jr. |
| 7,705,489 B2 | 4/2010 | Nielsen et al. |
| 7,726,144 B2 | 6/2010 | Larson et al. |
| 7,775,055 B2 | 8/2010 | Bean et al. |
| 7,799,474 B2 | 9/2010 | Lyon et al. |
| 7,832,925 B2 | 11/2010 | Archibald et al. |
| 7,844,440 B2 | 11/2010 | Nasle et al. |
| 7,881,910 B2 | 2/2011 | Rasmussen et al. |
| 7,885,795 B2 | 2/2011 | Rasmussen et al. |
| 7,908,126 B2 | 3/2011 | Bahel et al. |
| 7,975,156 B2 | 7/2011 | Artman et al. |

(56) References Cited

U.S. PATENT DOCUMENTS

| | | | |
|---|---|---|---|
| 7,979,250 B2 | 7/2011 | Archibald et al. |
| 7,991,592 B2 | 8/2011 | VanGilder et al. |
| 8,143,744 B2 | 3/2012 | Nielsen et al. |
| 8,155,922 B2 | 4/2012 | Loucks |
| 8,201,028 B2 | 6/2012 | Sawczak et al. |
| 8,219,362 B2 | 7/2012 | Shrivastava et al. |
| 8,228,046 B2 | 7/2012 | Ingemi et al. |
| 8,229,713 B2 | 7/2012 | Hamann et al. |
| 8,244,502 B2 | 8/2012 | Hamann et al. |
| 8,249,825 B2 | 8/2012 | VanGilder et al. |
| 8,315,841 B2 | 11/2012 | Rasmussen et al. |
| 8,425,287 B2 | 4/2013 | Wexler |
| 8,473,265 B2 | 6/2013 | Hlasny et al. |
| 8,509,959 B2 | 8/2013 | Zhang et al. |
| 8,825,451 B2 | 9/2014 | VanGilder et al. |
| 8,965,748 B2 | 2/2015 | Iyengar et al. |
| 2001/0005894 A1 | 6/2001 | Fukui |
| 2001/0042616 A1 | 11/2001 | Baer |
| 2001/0047213 A1 | 11/2001 | Sepe |
| 2001/0047387 A1 | 11/2001 | Brockhurst |
| 2001/0047410 A1 | 11/2001 | Defosse |
| 2001/0052006 A1 | 12/2001 | Barker et al. |
| 2001/0055965 A1 | 12/2001 | Delp et al. |
| 2002/0004912 A1 | 1/2002 | Fung |
| 2002/0023258 A1 | 2/2002 | Elwahab et al. |
| 2002/0043969 A1 | 4/2002 | Duncan et al. |
| 2002/0055909 A1 | 5/2002 | Fung et al. |
| 2002/0059804 A1 | 5/2002 | Spinazzola et al. |
| 2002/0062454 A1 | 5/2002 | Fung |
| 2002/0071031 A1 | 6/2002 | Lord et al. |
| 2002/0072868 A1 | 6/2002 | Bartone et al. |
| 2002/0101973 A1 | 8/2002 | Teixeira |
| 2002/0112054 A1 | 8/2002 | Hatanaka |
| 2002/0119339 A1 | 8/2002 | Ragland et al. |
| 2002/0124081 A1 | 9/2002 | Primm et al. |
| 2002/0129355 A1 | 9/2002 | Velten et al. |
| 2002/0130648 A1 | 9/2002 | Raddi et al. |
| 2002/0134096 A1 | 9/2002 | Shim et al. |
| 2002/0134567 A1 | 9/2002 | Rasmussen et al. |
| 2002/0149911 A1 | 10/2002 | Bishop et al. |
| 2002/0161885 A1 | 10/2002 | Childers et al. |
| 2002/0191425 A1 | 12/2002 | Geissler |
| 2003/0019221 A1 | 1/2003 | Rossi et al. |
| 2003/0033550 A1 | 2/2003 | Kuiawa et al. |
| 2003/0042004 A1 | 3/2003 | Novotny et al. |
| 2003/0048006 A1 | 3/2003 | Shelter et al. |
| 2003/0084357 A1 | 5/2003 | Bresniker et al. |
| 2003/0084358 A1 | 5/2003 | Bresniker et al. |
| 2003/0084359 A1 | 5/2003 | Bresniker et al. |
| 2003/0115000 A1 | 6/2003 | Bodas |
| 2003/0115024 A1 | 6/2003 | Snevely |
| 2003/0120780 A1 | 6/2003 | Zhu et al. |
| 2003/0121689 A1 | 7/2003 | Rasmussen et al. |
| 2003/0147214 A1 | 8/2003 | Patel et al. |
| 2003/0147216 A1 | 8/2003 | Patel et al. |
| 2003/0154285 A1 | 8/2003 | Berglund et al. |
| 2003/0158718 A1 | 8/2003 | Nakagawa et al. |
| 2003/0184975 A1 | 10/2003 | Steinman et al. |
| 2003/0188208 A1 | 10/2003 | Fung |
| 2003/0193777 A1 | 10/2003 | Friedrich et al. |
| 2003/0196126 A1 | 10/2003 | Fung |
| 2003/0200130 A1 | 10/2003 | Kall et al. |
| 2003/0200295 A1 | 10/2003 | Roberts et al. |
| 2003/0200473 A1 | 10/2003 | Fung |
| 2003/0204756 A1 | 10/2003 | Ransom et al. |
| 2003/0220026 A1 | 11/2003 | Oki et al. |
| 2003/0232598 A1 | 12/2003 | Aljadeff et al. |
| 2003/0236822 A1 | 12/2003 | Graupner et al. |
| 2004/0003266 A1 | 1/2004 | Moshir et al. |
| 2004/0010569 A1 | 1/2004 | Thomas et al. |
| 2004/0016243 A1 | 1/2004 | Song et al. |
| 2004/0020224 A1 | 2/2004 | Bash et al. |
| 2004/0031280 A1 | 2/2004 | Martin et al. |
| 2004/0031282 A1 | 2/2004 | Kopko |
| 2004/0057211 A1 | 3/2004 | Kondo et al. |
| 2004/0061030 A1 | 4/2004 | Goodwin et al. |
| 2004/0065097 A1 | 4/2004 | Bash et al. |
| 2004/0065100 A1 | 4/2004 | Jacobsen |
| 2004/0065104 A1 | 4/2004 | Bash et al. |
| 2004/0073597 A1 | 4/2004 | Caveney et al. |
| 2004/0075343 A1 | 4/2004 | Wareham et al. |
| 2004/0075984 A1 | 4/2004 | Bash et al. |
| 2004/0078708 A1 | 4/2004 | Li et al. |
| 2004/0083012 A1 | 4/2004 | Miller |
| 2004/0084967 A1 | 5/2004 | Nielsen |
| 2004/0089009 A1 | 5/2004 | Bash et al. |
| 2004/0089011 A1 | 5/2004 | Patel et al. |
| 2004/0098991 A1 | 5/2004 | Heyes |
| 2004/0099747 A1 | 5/2004 | Johnson et al. |
| 2004/0100770 A1 | 5/2004 | Chu et al. |
| 2004/0120331 A1 | 6/2004 | Rhine et al. |
| 2004/0120855 A1 | 6/2004 | Reichel et al. |
| 2004/0155526 A1 | 8/2004 | Naden et al. |
| 2004/0160789 A1 | 8/2004 | Ying et al. |
| 2004/0163001 A1 | 8/2004 | Bodas |
| 2004/0186905 A1 | 9/2004 | Young et al. |
| 2004/0189161 A1 | 9/2004 | Davis et al. |
| 2004/0190247 A1 | 9/2004 | Chu et al. |
| 2004/0230848 A1 | 11/2004 | Mayo et al. |
| 2004/0240514 A1 | 12/2004 | Bash et al. |
| 2004/0242197 A1 | 12/2004 | Fontaine |
| 2004/0262409 A1 | 12/2004 | Crippen et al. |
| 2005/0016189 A1 | 1/2005 | Wacker |
| 2005/0023363 A1 | 2/2005 | Sharma et al. |
| 2005/0036248 A1 | 2/2005 | Klikic et al. |
| 2005/0044882 A1 | 3/2005 | Hong et al. |
| 2005/0055590 A1 | 3/2005 | Farkas et al. |
| 2005/0061013 A1 | 3/2005 | Bond |
| 2005/0063542 A1 | 3/2005 | Ryu |
| 2005/0071699 A1 | 3/2005 | Hammond et al. |
| 2005/0108582 A1 | 5/2005 | Fung |
| 2005/0111669 A1 | 5/2005 | Park et al. |
| 2005/0114507 A1 | 5/2005 | Tarui et al. |
| 2005/0132729 A1 | 6/2005 | Manole |
| 2005/0168073 A1 | 8/2005 | Hjort |
| 2005/0170770 A1 | 8/2005 | Johnson et al. |
| 2005/0177755 A1 | 8/2005 | Fung |
| 2005/0185654 A1 | 8/2005 | Zadikian et al. |
| 2005/0198247 A1 | 9/2005 | Perry et al. |
| 2005/0201127 A1 | 9/2005 | Tracy et al. |
| 2005/0207909 A1 | 9/2005 | Bean et al. |
| 2005/0210905 A1 | 9/2005 | Burns et al. |
| 2005/0213306 A1 | 9/2005 | Vos et al. |
| 2005/0225936 A1 | 10/2005 | Day |
| 2005/0228618 A1 | 10/2005 | Patel et al. |
| 2005/0235671 A1 | 10/2005 | Belady et al. |
| 2005/0237715 A1 | 10/2005 | Staben et al. |
| 2005/0237716 A1 | 10/2005 | Chu et al. |
| 2005/0246431 A1 | 11/2005 | Spitaels |
| 2005/0247829 A1 | 11/2005 | Low et al. |
| 2005/0248922 A1 | 11/2005 | Chu et al. |
| 2005/0251802 A1 | 11/2005 | Bozek et al. |
| 2005/0267639 A1 | 12/2005 | Sharma et al. |
| 2005/0275976 A1 | 12/2005 | Taimela et al. |
| 2005/0278075 A1 | 12/2005 | Rasmussen et al. |
| 2005/0284169 A1 | 12/2005 | Tamura et al. |
| 2006/0002086 A1 | 1/2006 | Teneketges et al. |
| 2006/0025010 A1 | 2/2006 | Spitaels et al. |
| 2006/0042289 A1 | 3/2006 | Campbell et al. |
| 2006/0043792 A1 | 3/2006 | Hjort et al. |
| 2006/0043793 A1 | 3/2006 | Hjort et al. |
| 2006/0043797 A1 | 3/2006 | Hjort et al. |
| 2006/0044846 A1 | 3/2006 | Hjort et al. |
| 2006/0072262 A1 | 4/2006 | Paik et al. |
| 2006/0080001 A1 | 4/2006 | Bash et al. |
| 2006/0081545 A1 | 4/2006 | Rassmussen et al. |
| 2006/0082263 A1 | 4/2006 | Rimler et al. |
| 2006/0096306 A1 | 5/2006 | Okaza et al. |
| 2006/0102575 A1 | 5/2006 | Mattlin et al. |
| 2006/0108481 A1 | 5/2006 | Riedy et al. |
| 2006/0112286 A1 | 5/2006 | Whalley et al. |
| 2006/0115586 A1 | 6/2006 | Xing et al. |

(56) References Cited

U.S. PATENT DOCUMENTS

| | | |
|---|---|---|
| 2006/0121421 A1 | 6/2006 | Spitaels et al. |
| 2006/0126296 A1 | 6/2006 | Campbell et al. |
| 2006/0139877 A1 | 6/2006 | Germagian et al. |
| 2006/0144073 A1 | 7/2006 | Lee et al. |
| 2006/0162357 A1 | 7/2006 | Fink et al. |
| 2006/0168975 A1 | 8/2006 | Malone et al. |
| 2006/0203834 A1 | 9/2006 | Augustinus |
| 2006/0214014 A1 | 9/2006 | Bash et al. |
| 2006/0232945 A1 | 10/2006 | Chu et al. |
| 2006/0238941 A1 | 10/2006 | Ingemi et al. |
| 2006/0242288 A1 | 10/2006 | Masurkar |
| 2006/0250770 A1 | 11/2006 | Campbell et al. |
| 2006/0260338 A1 | 11/2006 | VanGilder et al. |
| 2006/0267974 A1 | 11/2006 | Kato et al. |
| 2006/0276121 A1 | 12/2006 | Rasmussen |
| 2006/0279970 A1 | 12/2006 | Kernahan |
| 2007/0019569 A1 | 1/2007 | Park et al. |
| 2007/0025271 A1 | 2/2007 | Niedrich et al. |
| 2007/0038414 A1 | 2/2007 | Rasmussen et al. |
| 2007/0055409 A1 | 3/2007 | Rasmussen et al. |
| 2007/0064363 A1 | 3/2007 | Nielsen et al. |
| 2007/0072536 A1 | 3/2007 | Johnson et al. |
| 2007/0074537 A1 | 4/2007 | Bean et al. |
| 2007/0076373 A1 | 4/2007 | Fink |
| 2007/0078634 A1 | 4/2007 | Krishnapillai |
| 2007/0078635 A1 | 4/2007 | Rasmussen et al. |
| 2007/0081302 A1 | 4/2007 | Nicolai et al. |
| 2007/0085678 A1 | 4/2007 | Joy et al. |
| 2007/0088822 A1 | 4/2007 | Coile et al. |
| 2007/0091569 A1 | 4/2007 | Campbell et al. |
| 2007/0091570 A1 | 4/2007 | Campbell et al. |
| 2007/0121295 A1 | 5/2007 | Campbell et al. |
| 2007/0129000 A1 | 6/2007 | Rasmussen et al. |
| 2007/0146994 A1 | 6/2007 | Germagian et al. |
| 2007/0150215 A1 | 6/2007 | Spitaels et al. |
| 2007/0150584 A1 | 6/2007 | Srinivasan |
| 2007/0163748 A1 | 7/2007 | Rasmussen et al. |
| 2007/0165377 A1 | 7/2007 | Rasmussen et al. |
| 2007/0167125 A1 | 7/2007 | Rasmussen et al. |
| 2007/0171613 A1 | 7/2007 | McMahan et al. |
| 2007/0174024 A1 | 7/2007 | Rasmussen et al. |
| 2007/0187343 A1 | 8/2007 | Colucci et al. |
| 2007/0190919 A1 | 8/2007 | Donovan et al. |
| 2007/0213000 A1 | 9/2007 | Day |
| 2007/0228837 A1 | 10/2007 | Nielsen et al. |
| 2007/0271475 A1 | 11/2007 | Hatasaki et al. |
| 2007/0274035 A1 | 11/2007 | Fink et al. |
| 2007/0291817 A1 | 12/2007 | Bradicich et al. |
| 2008/0002364 A1 | 1/2008 | Campbell et al. |
| 2008/0004837 A1 | 1/2008 | Zwinger et al. |
| 2008/0037217 A1 | 2/2008 | Murakami et al. |
| 2008/0041076 A1 | 2/2008 | Tutunoglu et al. |
| 2008/0041077 A1 | 2/2008 | Tutunoglu |
| 2008/0042491 A1 | 2/2008 | Klikic et al. |
| 2008/0055850 A1 | 3/2008 | Carlson et al. |
| 2008/0055852 A1 | 3/2008 | Uluc et al. |
| 2008/0061628 A1 | 3/2008 | Nielsen et al. |
| 2008/0067872 A1 | 3/2008 | Moth |
| 2008/0104985 A1 | 5/2008 | Carlsen |
| 2008/0105412 A1 | 5/2008 | Carlsen et al. |
| 2008/0105753 A1 | 5/2008 | Carlsen et al. |
| 2008/0141703 A1 | 6/2008 | Bean, Jr. |
| 2008/0142068 A1 | 6/2008 | Bean et al. |
| 2008/0144375 A1 | 6/2008 | Cheng |
| 2008/0157601 A1 | 7/2008 | Masciarelli et al. |
| 2008/0174954 A1 | 7/2008 | VanGilder et al. |
| 2008/0177424 A1 | 7/2008 | Wheeler |
| 2008/0180908 A1 | 7/2008 | Wexler |
| 2008/0197706 A1 | 8/2008 | Nielsen |
| 2008/0198549 A1 | 8/2008 | Rasmussen et al. |
| 2008/0229318 A1 | 9/2008 | Franke |
| 2008/0245083 A1 | 10/2008 | Tutunoglu et al. |
| 2008/0272744 A1 | 11/2008 | Melanson |
| 2009/0007591 A1 | 1/2009 | Bean et al. |
| 2009/0019875 A1 | 1/2009 | Fink et al. |
| 2009/0030554 A1 | 1/2009 | Bean, Jr. et al. |
| 2009/0039706 A1 | 2/2009 | Kotlyar et al. |
| 2009/0046415 A1 | 2/2009 | Rasmussen et al. |
| 2009/0121547 A1 | 5/2009 | Paik et al. |
| 2009/0138313 A1 | 5/2009 | Morgan et al. |
| 2009/0138888 A1 | 5/2009 | Shah et al. |
| 2009/0150123 A1 | 6/2009 | Archibald et al. |
| 2009/0168345 A1 | 7/2009 | Martini |
| 2009/0205416 A1 | 8/2009 | Campbell et al. |
| 2009/0210097 A1 | 8/2009 | Sawczak et al. |
| 2009/0223234 A1 | 9/2009 | Campbell et al. |
| 2009/0259343 A1 | 10/2009 | Rasmussen et al. |
| 2009/0268404 A1 | 10/2009 | Chu et al. |
| 2009/0276771 A1 | 11/2009 | Nickolov et al. |
| 2009/0309570 A1 | 12/2009 | Lehmann et al. |
| 2009/0326879 A1 | 12/2009 | Hamann et al. |
| 2009/0326884 A1 | 12/2009 | Amemiya et al. |
| 2010/0057263 A1 | 3/2010 | Tutunoglu |
| 2010/0106464 A1 | 4/2010 | Hlasny et al. |
| 2010/0170663 A1 | 7/2010 | Bean, Jr. |
| 2010/0211669 A1 | 8/2010 | Dalgas et al. |
| 2010/0211810 A1 | 8/2010 | Zacho |
| 2010/0256959 A1 | 10/2010 | VanGilder et al. |
| 2010/0286956 A1 | 11/2010 | VanGilder et al. |
| 2010/0287018 A1 | 11/2010 | Shrivastava et al. |
| 2011/0040529 A1 | 2/2011 | Hamann et al. |
| 2011/0213508 A1 | 9/2011 | Mandagere et al. |
| 2011/0246147 A1 | 10/2011 | Rasmussen et al. |
| 2011/0301911 A1 | 12/2011 | VanGilder et al. |
| 2012/0041569 A1 | 2/2012 | Zhang et al. |
| 2012/0071992 A1 | 3/2012 | VanGilder et al. |
| 2012/0158387 A1 | 6/2012 | VanGilder et al. |
| 2012/0170205 A1 | 7/2012 | Healey et al. |
| 2012/0221872 A1 | 8/2012 | Artman et al. |
| 2012/0245905 A1 | 9/2012 | Dalgas et al. |
| 2013/0006426 A1 | 1/2013 | Healey et al. |
| 2013/0030585 A1 | 1/2013 | Rasmussen et al. |
| 2013/0095494 A1 | 4/2013 | Neely |
| 2013/0139530 A1 | 6/2013 | Tutunoglu et al. |
| 2013/0297267 A1 | 11/2013 | Liang et al. |

FOREIGN PATENT DOCUMENTS

| | | |
|---|---|---|
| CN | 101132688 A | 2/2008 |
| CN | 101589656 A | 11/2009 |
| DE | 102006041788 A1 | 3/2008 |
| EP | 0602911 A1 | 6/1994 |
| EP | 1610077 A2 | 12/2005 |
| EP | 1672300 A1 | 6/2006 |
| EP | 2482213 A1 | 8/2012 |
| FR | 2624684 A1 | 6/1989 |
| FR | 2864854 A1 | 7/2005 |
| JP | 63-127042 A | 5/1988 |
| JP | 07-044275 A | 2/1995 |
| JP | 07269926 A | 10/1995 |
| JP | 09-298377 A | 11/1997 |
| JP | 2001-260640 A | 9/2001 |
| JP | 2002-101973 A | 4/2002 |
| JP | 2002-119339 A | 4/2002 |
| WO | 00/58673 A1 | 10/2000 |
| WO | 02/065030 A1 | 8/2002 |
| WO | 2003005200 A1 | 1/2003 |
| WO | 03/083631 A1 | 10/2003 |
| WO | 2003081406 A1 | 10/2003 |
| WO | 2005081091 A2 | 9/2005 |
| WO | 20050122664 A1 | 12/2005 |
| WO | 2006/034718 A1 | 4/2006 |
| WO | 2006119248 A2 | 11/2006 |
| WO | 20060124240 A2 | 11/2006 |
| WO | 2007095144 A2 | 8/2007 |
| WO | 2008144375 A2 | 11/2008 |
| WO | 2009/014893 A1 | 1/2009 |
| WO | 2010023619 A1 | 3/2010 |
| WO | 2011/019615 A1 | 2/2011 |
| WO | 2012037427 A1 | 3/2012 |
| WO | 2012082985 A2 | 6/2012 |

(56) References Cited

FOREIGN PATENT DOCUMENTS

WO 2012135038 A1 10/2012
WO 2013/095494 A1 6/2013

OTHER PUBLICATIONS

Donald L. Beaty et al., "High Density Cooling of Data Centers and Telecom Facilities-Part 2," 2005, ASHRAE Transactions, vol. 111, pp. 932-944.
James W. VanGilder et al., "Partially decoupled aisle method for estimating rack-cooling performance in near-real time," 2007, Proceedings of the IPACK2007 ASME InterPACK07, pp. 781-789.
Roger R. Schmidt et al., "Best practices for data center thermal and energy management-review of literature," ASHRAE Transactions, vol. 112, pp. 206-218 [2007].
S.L Sinha, R.C Arora, Subhransu Roy, Numerical simulation of two-dimensional room air flow with and without buoyancy, Energy and Buildings, vol. 32, Issue 1, Jun. 2000, pp. 121-129.
Tony Evans, "Fundamental Principles of Air Conditioners for Information Technology," White Paper #57, Revision 1, 2004 American Power Conversion, Rev 2004-1, pp. 1-9.
Tony Evans, "Humidification Strategies for Data Centers and Network Rooms," White Paper 58, 2004 American Power Conversion, Rev 2004-0, pp. 1-13.
Tony Evans, "The Different Types of Air Conditioning Equipment for IT Environments," White Paper #59, 2004 American Power Conversion, Rev 2004-0, pp. 1-21.
Toulouse M.M. et al., "Exploration of a potential-flow-based compact model of air-flow transport in data centers", Proceedings of the ASME International Mechanical Engineering Congress and Exposition—2009: Presented at 2009 ASME International Mechanical Engineering Congress and Exposition, Nov. 13-19, 2009, Lake Buena Vista, Florida, USA, vol. 13: New Del, vol. 13, Jan. 1, 2009 (Jan. 1, 2009), pp. 41-50, DOI: 10.1115/1MECE2009-10806, ISBN: 978-0-7918-4386-4.
Vanessa Lopez et al., "Measurement-based modeling for data centers", Thermal and Thermomechanical Phenomena in Electronic Systems (ITHERM), 2010 12th IEEE Intersociety Conference on, IEEE, Piscataway, NJ, USA, Jun. 2, 2010 (Jun. 2, 2010), pp. 1-8, XP031702357.
VanGilder et al, "Airflow Uniformity thourhg Perforated Tiles in a Raised-Floor Data Center", White Paper 121, Jul. 17-22, 2005, 10 pages.
VanGilder, "Real-Time Data Center Cooling Analysis," APC by Schneider Electric, Billerica, MA USA, Electronics Cooling, Sep. 2011, pp. 14-16.
VanGilder, James W. et al., "Caputure index: an airflow-based rack cooling performance metric," 2007, ASHRAE Transactions, vol. 113, pp. 126-136.
VanGilder, James W. et al., "Real-Time prediction of rack-cooling performance," 2006, ASHRAE Transactions, vol. 112, pp. 151-162.
Verhoff, A., The Two-Dimensional, Turbulent Wall Jet with and without an External Free Stream, Office of Naval Research Department of the Navy Contact Nonr 1858(14) in Co-Operation with Bureau of Naval Weapons, Report No. 626, May 1963.
"Case Study, Application of TileFlow to Improve Cooling in a Data Center," Innovative Research, Inc., 2004.
"Enthalpy" Published by the National Aeronautics and Space Administration and edited by Tom Benson. Retrieved on Jul. 13, 2009 from http://www.grc.nasa.gov/WWW/K-12/airplane/enthalpy.html, pp. 3.
"Essential Cooling System Requirements for Next Generation Data Centers," White Paper #5, Revision 3, 2003 American Power Conversion, Rev 2002-3, pp. 1-10.
"How and Why Mission-Critical Cooling Systems Differ From Common Air Conditions," White Paper #56, Revision 2, 2003 American Power Conversion, Rev 2003-2, pps. 1-13.
"Management Strategy for Network Critical Physical Infrastructure", White Paper #100, pp. 110, American Power Conversion, Dec. 15, 2003, published on World Wide Web.

Abi-Zadeh, Davar et al., "A Transient Analysis of Environmental Conditions for a Mission Critical Facility after a Failure of Power", Arup Mission Criticial Facilities, Feb. 2001, pp. 1-12.
Ahmad, Jasim U. et al., "Navier-Stokes simulation of air-conditioning facility of a large modern computer room," Jun. 2005, Proceedings of the 2005 ASME Fluids Engineering Division Summer Meeting and Exhibition, pp. 1-6.
Althouse, Turnquist, Bracciano: "Modern Refrigeration and Air Conditioning," 2000, The Goodheart-Willcox Company, Inc., XP002479591, pp. 715-716.
Anderson, Donald, "Iterative Procedures for Nonlinear Integral Equations," Journal of the Association for Computing Machinery, vol. 12, No. 4, Oct. 1965, pp. 547-560.
APC User's Guide Brochure, "InfraStruXure Manager," Mar. 2004, 181 pgs.
Ashrae, "Thermal Guidelines for Data Processing Environments" 2004, Atlanta: American Society of Heating, Refrigerating, and Air-Conditioning Engineers, Inc., 2004, Atlanta.
Baronti et al. "Wireless Sensor Networks: A Survey on the State of the Art and the 802.15.4 and ZigBee Standards". Computer Communications, Elsevier Science Publishers B.V. Amsterdam, NL. vol. 30, No. 7. Apr. 8, 2007. pp. 1655-1695.
Bash, C. E. et al.: "Balance of Power: Dynamic Thermal Management for Internet Data Centers", IEEE Internet Computing , Jan. 1, 2005, pp. 42-49, vol. 9, No. 1, IEEE Service Center, New York, NY.
Bash, C.E., Patel, C.D., and Sharma, R.K., "Efficient Thermal Management of Data Centers—Immediate and Long-Term Research Needs" Intl. J. Heat, Ventilating, Air-Conditioning and Refrigeration Research, 2003, pp. 137-152, vol. 9, No. 2.
Bejan Convection Heat Transfer, "Free Stream Turbulence," Ch. 8, pp. 282-305.
Bemis et al, Data Center Airflow Modeling: Helps Facilities Planners Make Informed Decisions. Applied Math Modeling Inc. 2009 [retrieved on Apr. 19, 2012). Retrieved from the Internet: <URL: http:l/www.coolsimsoftware.com/wwwrooULinkCiick.aspx?fileticket=r1 SqFUDtRTk%3D&tabid=189> entire document.
Chandrakant D. Patel, et al., "Thermal Considerations in Cooling Large Scale High Copute Density Data Centers" IEEE 2002, pp. 767-776.
Chen et al. "Analysis of the Key Agreement Scheme of ZigBee Standard". E-Business and Information System Security (E-BISS), 2010 2nd International Conference on IEEE, Pscataway, NJ USA. May 22, 2010.
Dvinsky: "Hot Tips for Using Cooling Software a Little Planning Lets Users Get More from Their Thermal-Simulation Software", Machine Design, Penton Media, Cleveland, OH, vol. 72, No. 4, Feb. 24, 2000.
Ehsan Pakabaznia et al., "Miminizing data center cooling and server power costs", Proceedings of the 14th ACM/IEEE International Symposium on Low Power Electronics and Design, ISLPED '09, Jan. 1, 2009 (Jan. 1, 2009), p. 145, XP55015368, New York, New York, USA, DOI: 10.1145/1594233.1594268, ISBN: 978-1-60-558684-7.
Healey, C., et al., "Potential-Flow Modeling for Data Center Applications," Proceedings of the ASME 2011 Pacific Rim Technical Conference & Exposition on Packaging and Integration of Electronic and Photonic Systems, IPACK2011-52136, Jul. 6-8, 2011.
Herrlin, M.K., "Rack Cooling Effectiveness in Data Centers and Telecom Central Offices: The Rack Cooling Index (RCI)," ASHRAE Transaction, 2005, pp. 725-731, vol. 111(2).
Innovative Research, Inc., http://web.archive.org/web/20051221005029/http://www.inres.com/, Dec. 21, 2005, published on World Wide Web.
Jeffrey Rambo et al., "Modeling of data center airflow and heat transfer: State of the art and future trends", Distributed and Parallel Databases, Kluwer Academic Publishers, BO, vol. 21, No. 2-3, Jan. 20, 2007 (Jan. 20, 2007), pp. 193-225, XP019499845, ISSN: 1573-7578, DOI:10.1007/S10619-006-7007-3.
Jeonghwan Choi et al., "A CFD-Based Tool for Studying Temperature in Rack-Mounted Servers", IEEE Transactions on Computers, IEEE Service Center, Los Alamitos, CA, US, vol. 57, No. 8, Aug. 1, 2008 (Aug. 1, 2008), pp. 1129-1142, ISSN: 0018-9340, DOI: 10.1109/TC.2008.52.

(56) References Cited

OTHER PUBLICATIONS

K. Dunlap, "Cooling Audit for Identifying Potential Cooling Problems in Data Centers", White Paper #40, pp. 1-18, American Power Conversion, May 20, 2004, published on World Wide Web.
Karki et al., "Techniques for controlling airflow distribution in raised-floor data centers," ASME 2003.
Le et al., "Operating Behaviour of Single Split Coil Systems Under Modulating and Two-Position Control", Published 2005 by American Society of Heating, Refrigerating and Air-Conditioning Engineers, Inc.
N. Rasmussen, "Calculating Total Cooling Requirements for Data Centers", White Paper #25, pp. 1-8, American Power Conversion, May 20, 2004, published on World Wide Web.
N. Rasmussen, "Cooling Strategies for Ultra-High Density Racks and Blade Servers", White Paper #46, pp. 1-22, American Power Conversion, Mar. 29, 2005, published on World Wide Web.
N. Rasmussen, "Strategies for Deploying Blade Servers in Existing Data Centers", White Paper #125, pp. 1-14, American Power Conversion, Mar. 29, 2005, published on World Wide Web.
Neil Rasmussen, "Air Distribution Architecture Options for Mission Critical Facilities," White Paper #55, Revision 1, 2003 American Power Conversion, Rev 2003-0, pp. 1-13.
Neil Rasmussen, "Avoidable Mistakes that Compromise Cooling Performance in Data Centers and Network Rooms," White Paper #49, 2003 American Power Conversion, Rev 2003-0, pp. 1-15.
Neil Rasmussen, "Cooling Options for Rack Equipment with Side-to-Side Airflow," White Paper #50, 2004 American Power Conversion, Rev 2004-0, pp. 1-14.
Neil Rasmussen, "Guidelines for Specification of Data Center Power Density," White Paper #120, 2005 American Power Conversion, Rev 2005-0, pp. 1-21.
Notification of Transmittal of the International Search Report and the Written Opinion of the International Searching Authority from corresponding for PCT/US2011/066776 dated May 2, 2012.
Pakbaznia, E.; Ghasemazar, M.; Pedram, M.:, "Temperature-aware dynamic resource provisioning in a power-optimized datacenter," Design, Automation & Test in Europe Conference & Exhibition (Date), 2010, vol., No., pp. 124-129, Mar. 8-12, 2010.
Pinheiro, Eduardo, "Load Balancing and Unbalancing for Power and Performance in Cluster-Based Systems," Internet Citation, May 1, 2001 URL:http://research.ac.upc.es/pact01/colp/paper04.pdf, retrieved on Nov. 17, 2003.
Refai-Ahmed G. et al., "Analysis of flow distribution in power supply using flow network modeling (FNM)", Thermal and Thermomechanical Phenomena in Electronic Systems, 2000, IT Herm 2000, The Seventh Intersociety Conference on May 23-26, 2000, Piscataway, NJ, USA, IEEE, Piscataway, NJ, USA, vol. 1, May 23, 2000 (May 23, 2000), pp. 90-98, ISBN: 978-0-7803-5912-3.
Rittal Catalogue, Aug. 2005, p. 115 and p. 140.
Rittal, <http://www.rittal.com/services_support/downloads/brochures.asp>, download page for catalogue 31.
Rittal, Catalogue 31, front page p. 672 and back page, Apr. 2005.
Sharma, R.K, Bash, C.E., and Patel, C.D, "Dimensionless Parameters for Evaluation of Thermal Design and Performance of Large-Scale Data Centers." 8th ASME/AIAA Joint Thermophysics and Heat Transfer Conference, Jun. 24-26, 2002. St. Louis, Missouri.
Shrivastava S K et al., Optimization of Cluster Cooling Performance for Data Centers, Thermal and Thermomechanical Phenomena in Electronic Systems, May 28, 2008, pp. 1161-1166, 11th Intersociety Conference on, IEEE, Piscataway, NJ.
Shrivastava S.K. et al., "A flow-network model for predicting rack cooling in containment systems", Proceedings of the ASME Interpack Conference—2009: Presented At 2009 ASME Interpack Conference, Jul. 19-23, 2009, San Francisco, California, USA, vol. 2, Jul. 19, 2009 (Jul. 19, 2009), pp. 785-791.
Texas Instruments Incorporated, "A True System-on-Chip Solution for 2.4 GHz IEEE 802.15.4 and ZigBee Applications," CC2530F32, CC2530F64, CC2530F128, CC2530F256, Apr. 2009—Revised Feb. 2011, www.ti.com, pp. 36.
Beitelmal et al., "Thermo-Fluids Provisioning of a High Pertormance High Density Data Center", Apr. 22, 2006, Springer Science and Business Media, Inc, Distributed and Parallel Databases, 21, pp. 227-238 DOI:1 0.1 007/s10619-005-0413-0.
Jack P. Holman: "Chapter 3 Steady-State Conduction" In: "Heat Transfer", 2002, McGraw Hill, XP055273397, pp. 71-130.
Marshall et al.: "Transient CRAC Failure Analysis", retrieved from the Internet: http://coolsimsoftware.com/Portals/0/PDF/WP_106_CRAC_Failure.pdf [retrieved Apr. 25, 16]; Dec. 31, 2010, pp. 1-7.
Vanessa Lopez et al: "Heat transfer modeling in data centers", International Journal of Heat and Mass Transfer, vo 1 . 54, No. 25, Sep. 15, 2011 (Sep. 15, 2011), pp. 5306-5318, XP028298268, ISSN: 0017-9310, DOI: 10.1016/J.IJHEATMASSTRANSFER.2011.08.012 [retrieved on Aug. 10, 2011].

SYSTEM AND METHOD FOR PREDICTION OF TEMPERATURE VALUES IN AN ELECTRONICS SYSTEM

This application is a U.S. National Stage Application under 35 U.S.C. §371 from International Application No. PCT/US2011/066776, filed Dec. 22, 2011, which is hereby incorporated by reference in its entirety for all purposes.

BACKGROUND

Field of the Invention

At least one embodiment in accordance with the present invention relates generally to systems and methods for management and design for electronics cooling systems, and more specifically, to systems and methods for predicting cooling performance within an electronics system, for example, a computer or telecommunications device or even a full-scale data center.

Discussion of Related Art

Modern electronics systems, for example, those associated with computer installations and other types of electronics which may dissipate heat, may exhibit improved performance when provided with a cooling system which may maintain the electronics system within a desired operating temperature range. A cooling system for an electronics system may include, for example, one or more fans or other cooling devices which may help remove heat generated from, for example, processors, power supplies, or other components of the electronics system. It may be desirable to model the efficacy of a cooling system for an electronic device or system during the design stage.

A particular form of electronics system which may utilize a cooling system to maintain a desired temperature within the system is a network data center. A network data center typically consists of various information technology equipment, collocated in a structure that provides network connectivity, electrical power and cooling capacity. Often the equipment is housed in specialized enclosures termed "racks" which integrate these connectivity, power and cooling elements. In some data center configurations, these rows are organized into hot and cold aisles to decrease the cost associated with cooling the information technology equipment. A raised floor having an air plenum beneath the floor is typically used for providing cooling air to the racks. Cool air is distributed from the air plenum to the racks through perforated tiles having open areas.

Various processes and software applications, such as the data center management systems available from American Power Conversion (APC) Corporation of West Kingston, R.I., have been developed to aid data center personnel in designing and maintaining efficient and effective data center configurations. These tools often guide data center personnel through activities such as designing the data center structure, positioning equipment within the data center prior to installation and repositioning equipment after construction and installation are complete. Thus, conventional tool sets provide data center personnel with a standardized and predictable design methodology.

SUMMARY OF THE INVENTION

A first aspect of the invention is directed to a computer-implemented method for evaluating cooling performance of an electronics system, the system including a plurality of physical components and at least one cooling provider. The method includes receiving information related to physical structures of the electronics system, dividing the electronics system into a computational grid including a plurality of fluid cells and a plurality of solid cells, positions of the plurality of solid cells corresponding to positions of the physical components within the electronics system, determining air flow values for the plurality of fluid cells using a potential flow model analysis, for each fluid cell of the plurality of fluid cells, determining a temperature of the fluid cell by calculating heat transfer into the fluid cell from any adjacent fluid cells and from any adjacent solid cells, for each solid cell of the plurality of solid cells, determining a temperature of the solid cell by calculating heat transfer into the solid cell from any adjacent solid cells and heat transfer out of the solid cell into any adjacent fluid cells, and storing, on a storage device, the air flow values and the temperature of the fluid cell and the temperature of the solid cell.

In accordance with some embodiments, determining one of the temperature of the fluid cell and the temperature of the solid cell includes using a heat transfer coefficient characterizing heat transfer from the solid cell to the liquid cell, wherein the heat transfer coefficient is derived from one of experimental results and previously conducted CFD analyses.

In accordance with some embodiments, each of the plurality of fluid cells is a three-dimensional cell.

In accordance with some embodiments, each of the plurality of solid cells is either a one dimensional cell or a two dimensional cell.

In accordance with some embodiments, the determination of the temperature of each of the plurality of fluid cells and the determination of the temperature of each of the plurality of solid cells is performed for a plurality of contiguous time periods.

In accordance with some embodiments, the method further comprises modeling an effect of a thermal disruption in the electronics system during a time period subsequent to the thermal disruption on the temperature of at least a portion of the plurality of solid cells.

In accordance with some embodiments, the method further comprises determining modified air flow values which are maintained in the plurality of fluid cells throughout the time period subsequent to the thermal disruption In accordance with some embodiments, the method further comprises modifying a configuration of the physical structures of the electronics system based on one of the air flow values, the temperature of the fluid cell and the temperature of the solid cell.

Another aspect of the invention is directed to a system for evaluating equipment in an electronics system, the equipment including a plurality of cooling consumers, and at least one cooling provider. The system includes an interface and a controller coupled to the interface. The controller is configured to receive information related to physical structures of the electronics system, divide the electronics system into a computational grid including a plurality of fluid cells and a plurality of solid cells, positions of the plurality of solid cells corresponding to positions of the physical components within the electronics system, determine air flow values for the plurality of fluid cells using a potential flow model analysis, for each fluid cell of the plurality of fluid cells, determine a temperature of the fluid cell by calculating heat transfer into the fluid cell from any adjacent fluid cells and from any adjacent solid cells, for each solid cell of the plurality of solid cells, determine a temperature of the solid cell by calculating heat transfer into the solid cell from any adjacent solid cells and heat transfer out of the solid cell into any adjacent fluid cells, and store, on a storage device, the air flow values and the temperature of the fluid cell and the temperature of the solid cell.

In accordance with some embodiments, the controller is configured to determine one of the temperature of the fluid cell and the temperature of the solid cell using a heat transfer coefficient characterizing heat transfer from the solid cell to the liquid cell, wherein the heat transfer coefficient is derived from one of experimental results and previously conducted CFD analyses.

In accordance with some embodiments, the controller is configured to determine the temperature of each of the plurality of fluid cells and to determine the temperature of each of the plurality of solid cells for a plurality of contiguous time periods.

In accordance with some embodiments, the controller is further configured to model an effect of a thermal disruption in the electronics system during a time period subsequent to the thermal disruption on the temperature of at least a portion of the plurality of solid cells.

In accordance with some embodiments, the controller is further configured to model the effect of the thermal disruption on the temperature of at least a portion of the plurality of fluid cells.

In accordance with some embodiments, wherein the interface is configured to provide for a user to modify a configuration of the physical structures of the electronics system.

Another aspect of the invention is directed to a computer readable medium having stored thereon sequences of instruction including instructions that will cause a processor to receive information related to physical structures of the electronics system, divide the electronics system into a computational grid including a plurality of fluid cells and a plurality of solid cells, positions of the plurality of solid cells corresponding to positions of the physical components within the electronics system, determine air flow values for the plurality of fluid cells using a potential flow model analysis, for each fluid cell of the plurality of fluid cells, determine a temperature of the fluid cell by calculating heat transfer into the fluid cell from any adjacent fluid cells and from any adjacent solid cells, for each solid cell of the plurality of solid cells, determine a temperature of the solid cell by calculating heat transfer into the solid cell from any adjacent solid cells and heat transfer out of the solid cell into any adjacent fluid cells, and store, on a storage device, the air flow values and the temperature of the fluid cell and the temperature of the solid cell.

In accordance with some embodiments, the instructions will cause the processor to determine one of the temperature of the fluid cell and the temperature of the solid cell using a heat transfer coefficient characterizing heat transfer from the solid cell to the liquid cell, wherein the heat transfer coefficient is derived from one of experimental results and previously conducted CFD analyses.

In accordance with some embodiments, the instructions will cause the processor to determine the temperature of each of the plurality of fluid cells and to determine the temperature of each of the plurality of solid cells for a plurality of contiguous time periods.

In accordance with some embodiments, the instructions will further cause the processor to model an effect of a thermal disruption in the electronics system during a time period subsequent to the thermal disruption on the temperature of at least a portion of the plurality of solid cells.

In accordance with some embodiments, the instructions will further cause the processor to model the effect of the thermal disruption on the temperature of at least a portion of the plurality of fluid cells.

In accordance with some embodiments, the instructions will cause the processor to modify a model of a configuration of the physical structures of the electronics system based on one of the air flow values, the temperature of the fluid cell and the temperature of the solid cell.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
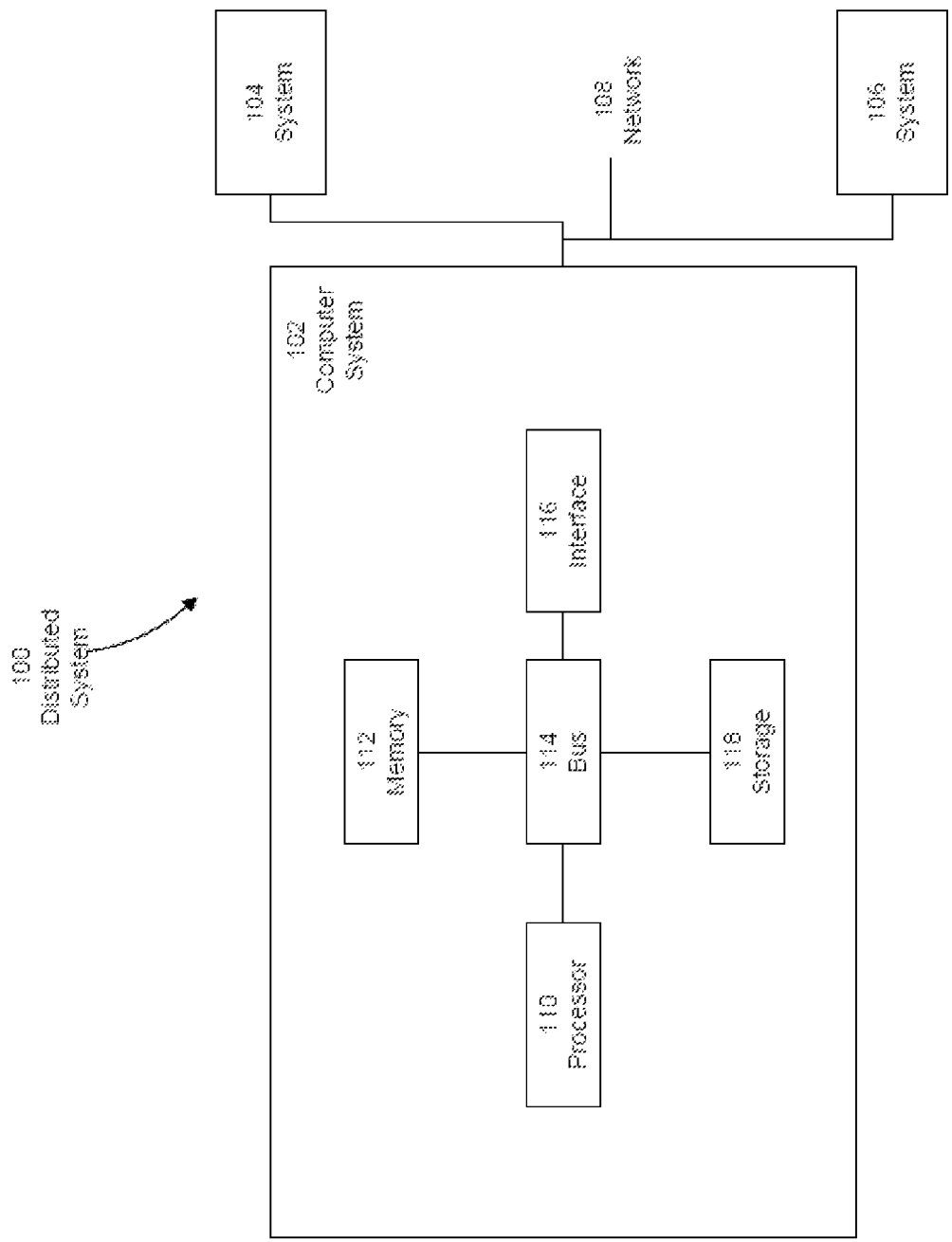
FIG. 1 is a block diagram of one example of a computer system with which various aspects in accord with the present invention may be implemented.

At least some embodiments in accordance with the present invention relate to systems and processes through which a user may design and analyze electronics system configurations. These systems and processes may facilitate this design and analysis activity by allowing the user to create models of electronics system configurations from which performance metrics may be determined. Both the systems and the user may employ these performance metrics to determine alternative system configurations that meet various design objectives.

A networked data center is described herein as one form of electronics system to which various aspects and embodiments of the invention may apply. However, it should be understood that networked data centers are only described as an illustrative example, and aspects and embodiments of the present invention may apply to other systems as well, for example, computers, audio and/or video systems, telecommunications systems, or other electronics systems which may produce heat.

As described in U.S. Pat. No. 7,991,592, titled "System and Method for Evaluating Equipment Rack Cooling," issued Aug. 2, 2011 (referred to herein as "the '592 patent"), in U.S. patent application Ser. No. 11/342,300, titled "Methods and Systems for Managing Facility Power and Cooling" filed Jan. 27, 2006 (referred to herein as "the '300 application"), and in U.S. patent application Ser. No. 12/884,832, titled "System and Method for Predicting Perforated Tile Airflow in a Data Center" filed Sep. 17, 2010 (referred to herein as "the '832 application"), each of which are assigned to the assignee of the present application, and each of which are hereby incorporated herein by reference in their entirety for all purposes, typical equipment racks in modern data centers draw cooling air into the front of the rack and exhaust air out of the rear of the rack. The equipment racks and in-row coolers are typically arranged in rows in an alternating front/back arrangement creating alternating hot and cool aisles in a data center with the front of each row of racks facing the cool aisle and the rear of each row of racks facing the hot aisle. Adjacent rows of equipment racks separated by a cool aisle may be referred to as a cool aisle cluster, and adjacent rows of equipment racks separated by a hot aisle may be referred to as a hot aisle cluster. Further, single rows of equipment may also be considered to form both a cold and a hot aisle cluster by themselves. A row of equipment racks may be part of multiple hot aisle clusters and multiple cool aisle clusters. In the referenced applications, tools are provided for analyzing the cooling performance of a cluster of racks in a data center. In these tools, multiple analyses may be performed on different layouts to attempt to optimize the cooling performance of the data center.

In descriptions and claims herein, electrical or electronic components which may generate heat, for example equipment in racks, or the racks themselves in network data centers, may be referred to as cooling consumers. Cooling consumers are not limited to these examples, and may include other electronic systems, for example, computers or audio/video equipment, or other electrical or electronic systems known in the art. Devices such as fans, liquid cooling systems, and in the example of network data centers, in-row cooling units and/or computer room air conditioners (CRACs), may be referred to herein as cooling providers. Cooling providers are not limited to these examples, and may include other systems, for example, evaporative coolers, peltier effect coolers, or other cooling systems known in the art.

In at least one embodiment, a method is provided for performing, in real-time, an analysis on a layout of equipment in a data center for providing predictions of air temperatures within and at inlets and exhausts of equipments racks and cooling providers and the ambient temperature of a data center.

The aspects and embodiments of the present invention disclosed herein are not limited in their application to the details of construction and the arrangement of components set forth in the following description or illustrated in the drawings. These aspects are capable of assuming other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

For example, according to one embodiment of the present invention, a computer system is configured to perform any of the functions described herein, including but not limited to, configuring, modeling and presenting information regarding specific electronics system configurations. Further, computer systems in embodiments may be used to automatically measure environmental parameters in an electronics system, and control equipment, such as chillers or coolers to optimize performance. Moreover, the systems described herein may be configured to include or exclude any of the functions discussed herein. Thus the embodiments are not limited to a specific function or set of functions. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

Computer System

Various aspects and functions described herein in accordance with the present embodiments may be implemented as hardware or software on one or more computer systems. There are many examples of computer systems currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects in accordance with the present embodiments may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the embodiments are not limited to executing on any particular system or group of systems. Further, aspects may be implemented in software, hardware or firmware, or any combination thereof. Thus, aspects in accordance with the present embodiments may be implemented within methods, acts, systems, system elements and components using a variety of hardware and software configurations, and the embodiments are not limited to any particular distributed architecture, network, or communication protocol.

FIG. 1 shows a block diagram of a distributed computer system 100, in which various aspects and functions in accord with the present embodiments may be practiced. Distributed computer system 100 may include one more computer systems. For example, as illustrated, distributed computer system 100 includes computer systems 102, 104, and 106. As shown, computer systems 102, 104, and 106 are interconnected by, and may exchange data through, communication network 108. Network 108 may include any communication network through which computer systems may exchange data. To exchange data using network 108, computer systems 102, 104, and 106 and network 108 may use various methods, protocols and standards, including, among others, token ring, Ethernet, wireless Ethernet, Bluetooth, TCP/IP, UDP, Http, FTP, SNMP, SMS, MMS, SS7, Json, Soap, and Corba. To ensure data transfer is secure, computer systems 102, 104, and 106 may transmit data via network 108 using a variety of security measures including TLS, SSL or VPN among other security techniques. While distributed computer system 100 illustrates three networked computer systems, distributed computer system 100 may include any number of computer systems and computing devices, networked using any medium and communication protocol.

Various aspects and functions in accordance with the present embodiments may be implemented as specialized hardware or software executing in one or more computer systems including computer system 102 shown in FIG. 1. As depicted, computer system 102 includes processor 110, memory 112, bus 114, interface 116, and storage 118.

Processor 110 may perform a series of instructions that result in manipulated data. Processor 110 may be a commercially available processor such as an Intel Pentium, Motorola PowerPC, SGI MIPS, Sun UltraSPARC, or Hewlett-Packard PA-RISC processor, but may be any type of processor, multi-processor, microprocessor or controller as many other processors and controllers are available. Processor 110 is connected to other system elements, including one or more memory devices 112, by bus 114.

Memory 112 may be used for storing programs and data during operation of computer system 102. Thus, memory 112 may be a relatively high performance, volatile, random access memory such as a dynamic random access memory (DRAM) or static memory (SRAM). However, memory 112 may include any device for storing data, such as a disk drive or other non-volatile, non-transitory, storage device. Various embodiments in accordance with the present invention may organize memory 112 into particularized and, in some cases, unique structures to perform the aspects and functions disclosed herein.

Components of computer system 102 may be coupled by an interconnection element such as bus 114. Bus 114 may include one or more physical busses, for example, busses between components that are integrated within a same machine, but may include any communication coupling between system elements including specialized or standard computing bus technologies such as IDE, SCSI, PCI and InfiniBand. Thus, bus 114 enables communications, for example, data and instructions, to be exchanged between system components of computer system 102.

Computer system 102 also includes one or more interface devices 116 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow computer system 102 to exchange information and communicate with external entities, such as users and other systems.

Storage system 118 may include a computer readable and writeable, nonvolatile, non-transitory, storage medium in which instructions are stored that define a program to be executed by the processor. Storage system 118 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk, or flash memory, among others. In operation, the processor or some other controller may cause data to be read from the nonvolatile recording medium into another memory, such as memory 112, that allows for faster access to the information by the processor than does the storage medium included in storage system 118. The memory may be located in storage system 118 or in memory 112, however, processor 110 may manipulate the data within the memory 112, and then may copy the data to the medium associated with storage system 118 after processing is completed. A variety of components may manage data movement between the medium and integrated circuit memory element and the presently described embodiments are not limited thereto. Further, the embodiments are not limited to a particular memory system or data storage system.

Although computer system 102 is shown by way of example as one type of computer system upon which various aspects and functions in accordance with the present embodiments may be practiced, any aspects of the presently disclosed embodiments are not limited to being implemented on the computer system as shown in FIG. 1. Various aspects and functions in accord with the presently disclosed embodiments may be practiced on one or more computers having a different architectures or components than that shown in FIG. 1. For instance, computer system 102 may include specially-programmed, special-purpose hardware, such as for example, an application-specific integrated circuit (ASIC) tailored to perform a particular operation disclosed herein. While another embodiment may perform the same function using several general-purpose computing devices running MAC OS System X with Motorola PowerPC processors and several specialized computing devices running proprietary hardware and operating systems.

Computer system 102 may be a computer system including an operating system that manages at least a portion of the hardware elements included in computer system 102. Usually, a processor or controller, such as processor 110, executes an operating system which may be, for example, a Windows-based operating system such as Windows NT, Windows 2000 (Windows ME), Windows XP, or Windows Vista operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating system available from various sources. Many other operating systems may be used, and embodiments are not limited to any particular implementation.

The processor and operating system together define a computer platform for which application programs in high-level programming languages may be written. These component applications may be executable, intermediate, for example, C−, bytecode or interpreted code which communicates over a communication network, for example, the Internet, using a communication protocol, for example, TCP/IP. Similarly, aspects in accord with the presently disclosed embodiments may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions in accordance with the presently disclosed embodiments may be implemented in a non-programmed environment, for example, documents created in HTML, XML or other format that, when viewed in a window of a browser program, render aspects of a graphical-user interface or perform other functions. Further, various embodiments in accord with the present invention may be implemented as programmed or non-programmed elements, or any combination thereof. For example, a web page may be implemented using HTML while a data object called from within the web page may be written in C++. Thus, the presently disclosed embodiments are not limited to a specific programming language and any suitable programming language could also be used.

A computer system included within an embodiment may perform additional functions outside the scope of the presently disclosed embodiments. For instance, aspects of the system may be implemented using an existing commercial product, such as, for example, Database Management Systems such as SQL Server available from Microsoft of Seattle Wash., Oracle Database from Oracle of Redwood Shores, Calif., and MySQL from MySQL AB, a subsidiary of Oracle or integration software such as Web Sphere middleware from IBM of Armonk, N.Y. However, a computer system running, for example, SQL Server may be able to support both aspects in accord with the presently disclosed embodiments and databases for sundry applications.

Example System Architecture

Figure 2:
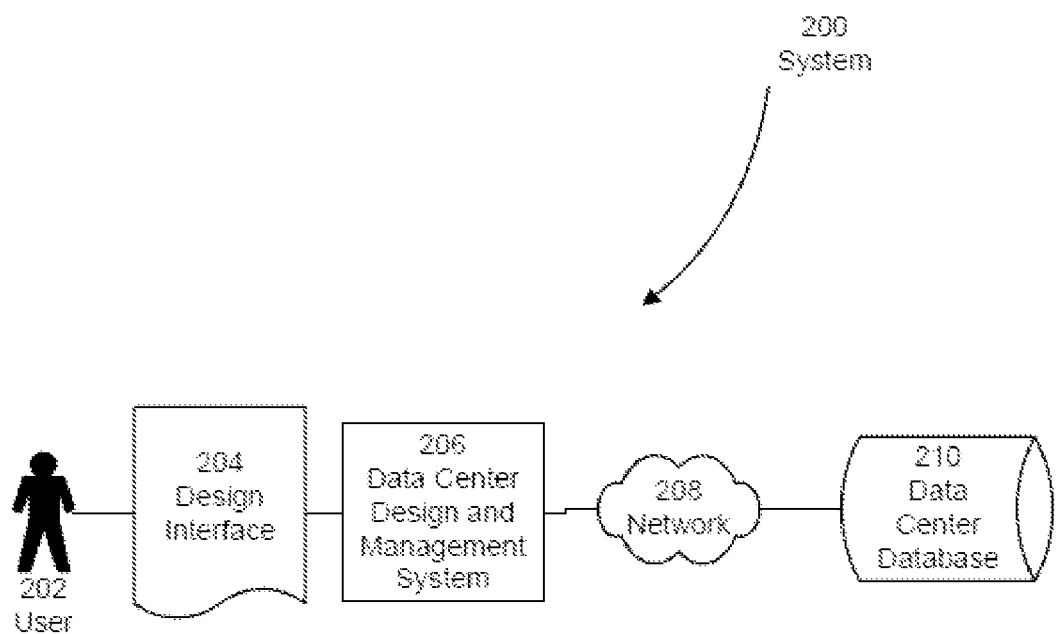
FIG. 2 a schematic of one example of a distributed system including an electronics system management system.

FIG. 2 presents a context diagram including physical and logical elements of distributed system 200. As shown, distributed system 200 is specially configured in accordance with the presently disclosed embodiments. The system structure and content recited with regard to FIG. 2 is for exemplary purposes only and is not intended to limit the embodiments to the specific structure shown in FIG. 2. FIG. 2 uses a data center as an example of an electronics system to which aspects and embodiments of the preset invention may apply, however, the present invention contemplates application to other systems, for example, computers, audio/video systems, consumer electronics, or any other electric or electronic systems known in the art. As will be apparent to one of ordinary skill in the art, many variant system structures can be architected without deviating from the scope of the presently disclosed embodiments. The particular arrangement presented in FIG. 2 was chosen to promote clarity.

Information may flow between the elements, components and subsystems depicted in FIG. 2 using any technique. Such techniques include, for example, passing the information over the network via TCP/IP, passing the information between modules in memory and passing the information by writing to a file, database, or some other non-volatile storage device. Other techniques and protocols may be used without departing from the scope of the presently disclosed embodiments.

Referring to FIG. 2, system 200 includes user 202, interface 204, data center design and management system 206, communications network 208, and data center database 210. System 200 may allow user 202, such as a data center architect or other data center personnel, to interact with interface 204 to create or modify a model of one or more data center configurations. According to one embodiment, interface 204 may include aspects of the floor editor and the rack editor as disclosed in Patent Cooperation Treaty Application No. PCT/US08/63675, titled "Methods and Systems for Managing Facility Power and Cooling," filed on May 15, 2008, which is incorporated herein by reference in its entirety and is hereinafter referred to as PCT/US08/63675. In other embodiments, interface 204 may be implemented with specialized facilities that enable user 202 to design, in a drag and drop fashion, a model that includes a representation of the physical layout of a data center or any subset thereof. This layout may include representations of data center structural components as well as data center equipment. The features of interface 204, as may be found in various embodiments in accordance with the present invention, are discussed further below. In at least one embodiment, information regarding a data center is entered into system 200 through the interface, and assessments and recommendations for the data center are provided to the user. Further, in at least one embodiment, optimization processes may be performed to optimize cooling performance and energy usage of the data center.

As shown in FIG. 2, data center design and management system 206 presents data design interface 204 to user 202. According to one embodiment, data center design and management system 206 may include the data center design and management system as disclosed in PCT/US08/63675. In this embodiment, design interface 204 may incorporate functionality of the input module, the display module and the builder module included in PCT/US08/63675 and may use the database module to store and retrieve data.

As illustrated, data center design and management system 206 may exchange information with data center database 210 via network 208. This information may include any information needed to support the features and functions of data center design and management system 206. For example, in one embodiment, data center database 210 may include at least some portion of the data stored in the data center equipment database described in PCT/US08/63675. In another embodiment, this information may include any information needed to support interface 204, such as, among other data, the physical layout of one or more data center model configurations, the production and distribution characteristics of the cooling providers included in the model configurations, the consumption characteristics of the cooling consumers in the model configurations, and a listing of equipment racks and cooling providers to be included in a cluster.

In one embodiment, data center database 210 may store types of cooling providers, the amount of cool air provided by each type of cooling provider, and a temperature of cool air provided by the cooling provider. Thus, for example, data center database 210 includes records of a particular type of CRAC unit in a data center that is rated to deliver airflow at the rate of 5,600 cubic feet per minute (cfm) at a temperature of 68 degrees Fahrenheit. In addition, the data center database 210 may store one or more cooling metrics, such as inlet and outlet temperatures of the CRACs and inlet and exhaust temperatures of one or more equipment racks. The temperatures may be periodically measured and input into the system, or in other embodiments, the temperatures may be continuously monitored using devices coupled to the system 200.

Data center database 210 may take the form of any logical construction capable of storing information on a computer readable medium including, among other structures, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

The computer systems shown in FIG. 2, which include data center design and management system 206, network 208 and data center equipment database 210, each may include one or more computer systems. As discussed above with regard to FIG. 1, computer systems may have one or more processors or controllers, memory and interface devices. The particular configuration of system 200 depicted in FIG. 2 is used for illustration purposes only and embodiments of the invention may be practiced in other contexts. Thus, embodiments of the invention are not limited to a specific number of users or systems.

Airflow and Temperature Prediction Tool

Aspects and embodiments of a Potential Flow Model (PFM) to predict airflow patterns, pressures, air temperatures, and capture indices for data center applications was described in U.S. patent application Ser. No. 12/970,605, titled "System and Methods for Rack Cooling Analysis"

filed Dec. 16, 2010 (referred to herein as "the '605 application"), which is assigned to the assignee of the present application, and which is hereby incorporated herein by reference in its entirety for all purposes. In some electronics systems, for example, data centers incorporating equipment racks and coolers, solid surfaces such as the sides of racks and coolers, walls, etc. pose an obstruction to airflow but do not directly take part in heat transfer. Generally, no heat flows into or out of solid surfaces except at a flow boundary (for example a rack exhaust or cooler return). To provide accurate predictions of solid-object temperatures, it may be desired that the "conjugate" heat transfer problem be solved. The "conjugate" heat transfer analysis is the simultaneous prediction of the coupled fluid and solid temperatures and involves heat transfer across a solid-fluid interface. The prediction of solid temperatures may also be called a "conduction analysis" because conduction is the only mode of heat transfer at play inside a solid. This is routinely done in full Computational Fluid Dynamics (CFD) methods for applications such as predicting the temperatures of important components (for example, the "junction" temperature inside a CPU). Computational methods in accordance with embodiments of the present invention employing PFM may provide similar predictions as a full CFD analysis but with significantly fewer calculations.

At least some aspects and embodiments of the present invention extend the PFM approach to handle conjugate heat transfer where the primary application is electronics cooling. However, aspects and embodiments of the present invention may apply to many systems in which fluid and solid temperatures must be computed simultaneously. Other notable applications include data centers, consumer electronics, general commercial and public buildings, and industrial applications where the fluid involved may be air, water, or any other liquid or gas.

Conjugate PFM (CPFM)

The combined PFM and solid conduction heat transfer will be referred to herein as "Conjugate PFM (CPFM)." For steady-state applications, the fluid flow may only need to be determined once; however, for transient analysis, the fluid flow pattern may be determined as many times as needed, for example, following a fan failure or a fan speed change. In some embodiments a new fluid flow pattern is only determined once following a transient event. The same new fluid flow pattern may be used in temperature calculations for a number of time periods following the transient event. Determining the fluid flow patterns using a PFM analysis will not be reviewed here as this has been well described in, for example, the '605 application. However, it is noted that in electronics-cooling and other applications, the flow rate through fans often depends strongly on the environment in which the fans are placed. In this case, pressures in addition to velocities may be computed so that the fan flow rate can be determined based on manufacturer-supplied data. This would be similar to determining the airflow through perforated tiles as described in the '832 application.

In PFM, the fluid flow is idealized as irrotational. This idealization places some limitations on the ability of PFM to predict complex recirculation zones, jets, and other flow features. Additionally, buoyancy forces are not typically included in PFM predictions. Consequently, CPFM will be more accurate the smaller buoyancy forces are relative to momentum forces, for example, in air flows driven by fans. In return for the loss of some fidelity to the real physics, PFM is vastly simpler and more reliable than CFD (i.e., it essentially always converges to an answer) and solution times are typically a few seconds compared to minutes to hours for CFD. For many applications the reduction of accuracy relative to CFD may be minimal and other cases it may be modest but justifiable because, for example, only reasonable estimates are required at an early design stage or precise input data is unobtainable so that the additional theoretical solution accuracy of CFD would not be realized in practice.

Steady-State Applications

Figure 3:
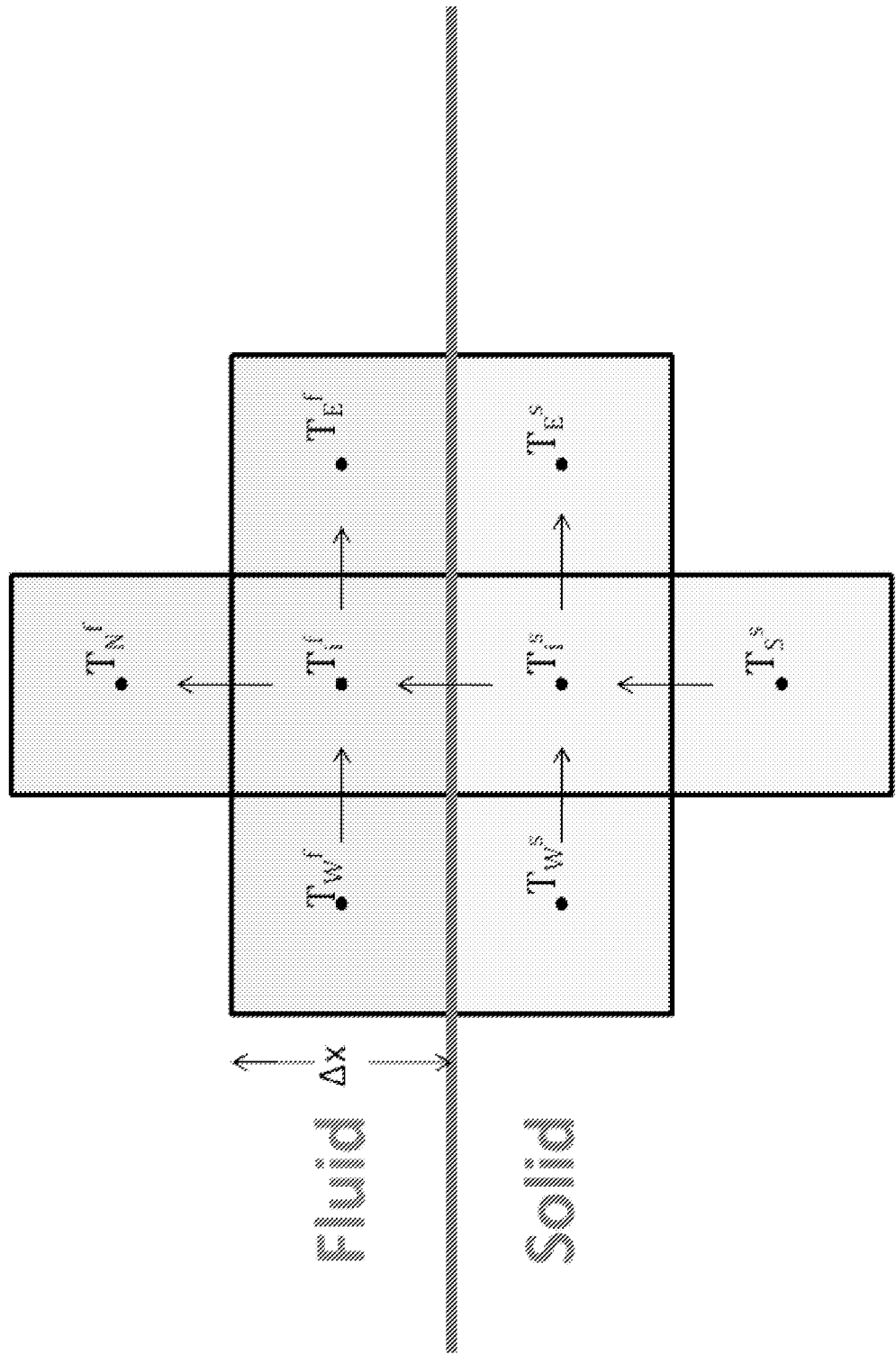
FIG. 3 demonstrates the use of grid cells in accordance with at least one example.

With CPFM, the volume to be modeled is divided up into grid cells as done with PFM, but with CPFM, a computational grid is defined within the solids as well as within the fluid. In various aspects, the grid cells may be either one-dimensional, two-dimensional, or three dimensional. In further aspects, solid objects may be represented as one dimensional thermal networks rather than with multi-dimensional cells. In some embodiments only the interface between a solid object and a fluid, such as air, is taken into account, and calculations are not performed for temperatures or heat flow within the solid object. FIG. 3 shows general fluid and solid grid cells on either side of a fluid-solid interface. The subscripts "N," "S," "E," and "W" in the cell labels in this figure refer to cells to the north, south, east, and west, respectfully of a cell of interest with a subscript "i." The superscripts "f" and "s" in the cell labels in this figure indicate whether the cell is part of a fluid (for example, air) or a solid, respectfully. The black arrows represent the assumed direction of heat flow across cell faces and also the direction of fluid flow for the fluid cells. For simplicity and clarity of the analysis which follows, grid cells are assumed to be perfectly cuboidal with all sides of length Δx and equations are developed only for the 2D case. In some embodiments, the method can easily be extended to include non-uniform grid cells, unstructured grids, and 3D scenarios. In the examples which follow, airflow velocities are assumed to be known from a PFM analysis.

A steady-state energy balance on the fluid grid cell yields an equation for the temperature of fluid cell:

$$T_i^f = \left(\frac{1}{1+\frac{h}{V_W \rho^f c_p^f}}\right) T_W^f + \left(\frac{1}{1+\frac{V_W \rho^f c_p^f}{h}}\right) T_i^s \quad (1)$$

Where $T_i^f$ is the temperature of fluid cell i, $T_w^f$ is the temperature of the fluid cell to the west of fluid cell i, $T_i^s$ is the temperature of solid cell i, $V_N$, $V_E$, and $V_W$ are the known flow velocities across cell boundaries to the North, East, and West respectively, h is the heat transfer coefficient, $\rho^f$ is the density of the fluid, and $c_p^f$ is the specific heat of the fluid. Equation (1) has also been simplified to reflect the fact that, for this simple example, $V_N + V_E = V_W$. The heat transfer coefficient h is defined by Newton's Law of Cooling:

$$q''' = h(T^s - T^f) \quad (2)$$

where q''' is the heat transfer per unit area (for example, in W/m$^2$) and $T^s$ and $T^f$ are the solid and fluid temperatures, respectively. The heat transfer coefficient depends on the flow pattern near the surface as well as the physical properties of the fluid and has been extensively correlated against experimental measurements for simple configurations like that of uniform flow past a flat plate. Correlations for a flat plate configuration are:

$$Nu = 0.664 Re^{1/2} Pr^{1/3} \text{ is } Re < 5 \times 10^5$$

$$Nu = (0.037 Re^{4/5} - 871) Pr^{1/2} \text{ if } Re \geq 5 \times 10^5 \quad (3)$$

where, $$Nu = \frac{hL}{k} = \text{Nusselt Number,}$$

a dimensionless form of the heat transfer coefficient $$\text{Re} = \frac{\rho V L}{\mu} = \text{Reynolds Number,}$$

a dimensionless number which determines flow regime $$Pr = \frac{\mu c_p}{k} = \text{Prandtl Number,}$$

a dimensionless number summarizing certain physical properties of the fluid

L=characteristic length scale
k=thermal conductivity of the fluid
V=characteristic flow velocity
μ=viscosity of fluid In the derivation of Equation (1) above, a standard "upwind" model was utilized which assumes that energy is conducted into or out of the grid cell only in the direction of the flow. This equation also neglects conduction heat transfer in the fluid as convection (i.e., energy transfer to the bulk movement of fluid) is usually dominant. In other embodiments, these terms could be included in the analysis and terms for the temperatures of all neighboring cells would appear in Equation (1).

Energy transfer through the faces of the solid grid cell of FIG. 3 is due purely to conduction except for the top face where there is convection heat transfer with the fluid. A steady-state energy balance on the solid cell yields an equation for the temperature of the solid cell i:

$$T_i^s = \left(\frac{1}{3 + \frac{h\Delta x}{k^s}}\right)(T_W^s + T_E^s + T_S^s) + \left(\frac{1}{1 + \frac{3k^s}{h\Delta x}}\right)T_i^f \quad (4)$$

where $T_W^s$, $T_E^s$, and $T_S^s$ are the solid temperatures of cells to the West, East, and South respectively and $k^s$ is the thermal conductivity of the solid.

For a steady-state application, equations similar to Equations (1) and (4) may be written for all grid cells. The exact form of the equations may vary depending on the location of the cell which defines the conditions on each face of the cell. For example, for fluid or solid cells completely surrounded by other cells of their same type, there is no fluid-solid interface and the equations will not contain the heat transfer coefficient, h. The equations may be solved using any one of a variety of techniques, for example, Gauss-Seidel iteration, and the solution may sweep through all solid and fluid cells at each iteration or many iterations may be performed separately in the fluid and the solid before returning to the other region. Some iteration back and forth between fluid and solid may be required as the temperature of the boundary cells affects the temperature in the other region. The coupling of the fluid and solid temperatures is facilitated by the heat transfer coefficient h. The heat transfer coefficient is determined from either experimental correlations or empirical correlations determined from CFD analyses performed "offline" and the h may be based, in part, on the local fluid flow velocities as determined in the PFM analysis.

Figure 4:
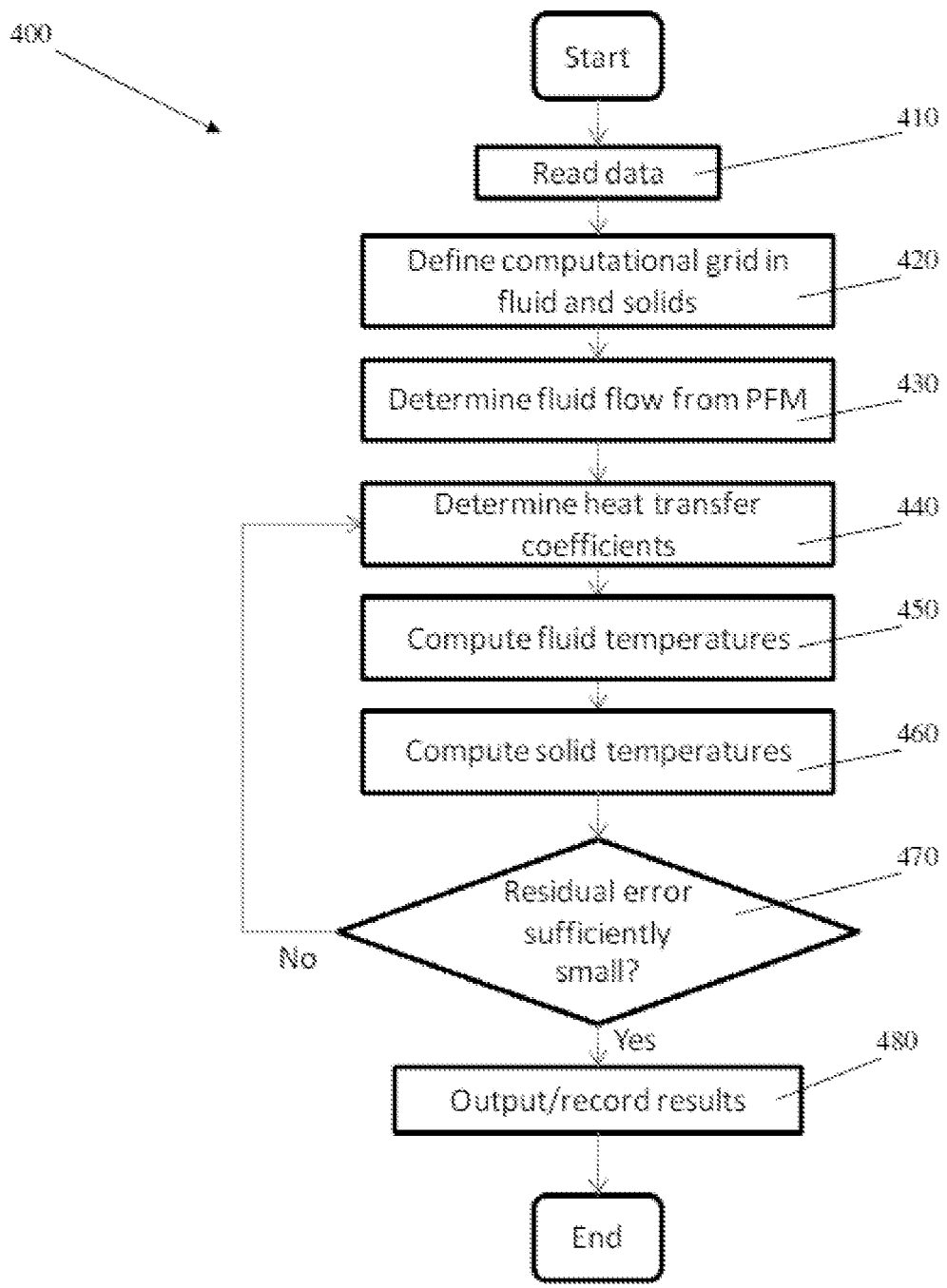
FIG. 4 is a flowchart of a process in accordance with one example.

A flow chart of the steady-state solution process is shown in FIG. 4, indicated generally at 400. After reading all data related to the configuration of the data center (act 410), a computational grid is defined (act 420), and the fluid flow pattern, i.e., the velocity at each cell face, is determined from a PFM analysis (act 430). Next the temperature distributions in the fluid and solid cells are determined sequentially (acts 440-460). The process continues until residual error (imbalance of energy flows over all cells) is considered to be smaller than a threshold (act 470), for example, 0.5% of all of the power dissipated in the system being analyzed. Results may then be output to a user (act 480).

Transient Applications

In the transient scenario, the fluid flow may be modeled as a series of steady-state flow patterns, where the number of flow patterns predicted depends upon the scenario being analyzed. The scenario may include a thermal disruption; an event where heat produced from a source of heat is either increased or decreased, including events when the source of heat is enabled or disabled, or an event where a cooling provider becomes more or less capable of removing heat from a system, including events where the cooling provider becomes enabled or disabled. Consider, for example, a scenario in which a desktop computer is operating normally, then, at some reference time t=0, one of two cooling fans fails. If it is desired to determine component temperatures at times following t=0, at least two airflow patterns should be determined: the initial airflow pattern with both fans running and the later airflow pattern when only one fan is running.

An equation for the temperature of fluid cell i of FIG. 3 including the transient heating or cooling of the fluid contained in the grid cell is derived as follows. The transient term can be represented as:

$$\text{the rate of change of stored energy} = \rho^f c_p^f V^f \frac{dT_i^f}{dt} \approx \rho^f c_p^f V^f \frac{T_i^{f+} - T_i^f}{\Delta t} \quad (5)$$

where $T_i^{f+}$ is the temperature of fluid cell i after a time step of Δt, $\rho^f$ is the density of the fluid, $c_p^f$ is the specific heat of the fluid and $V^f = \Delta x^3$ is the fluid cell volume. Including this term in the energy balance for grid cell i leads to the following expression for the temperature of the fluid cell at a future time:

$$T_i^{f+} = T_i^f + \frac{\Delta t}{\Delta x}\left[V_w(T_W^f - T_i^f) + \frac{h}{\rho^f c_p^f}(T_i^s - T_i^f)\right] \quad (6)$$

An energy balance including the transient heating or cooling of solid cell i of FIG. 3 leads to:

$$T_i^{s+} = T_i^s + \frac{h\Delta t}{\Delta x \rho^s c_p^s}(T_i^f - T_i^s) + \frac{k\Delta t}{\Delta x^2 \rho^s c_p^s}(T_E^s + T_W^s + T_S^s - 3T_i^s) \quad (7)$$

where $T_i^{s+}$ is the temperature of solid cell i after a time step of Δt.

Equations (6) and (7) are "explicit" representations of the temperature in the fluid and solid cells respectively at a future time. Therefore, with this approach, the temperature over all cells can be computed sequentially for a given time step. Then, these temperatures are used on the right-hand side of Equations (6) and (7) to compute temperatures at the next time step. This process continues until the desired transient period has been covered. In some embodiments, in Equation (5), the temperatures of all neighboring cells at the current time are evaluated.

In some embodiments it is also possible to represent the temperatures of all neighboring cells also at the future time. This is referred to herein as an "implicit" approach because the temperature at cell i cannot be isolated and in Equations (6) and (7), all neighboring-cell temperatures would be denoted with a "+" superscript and become unknowns. With the implicit approach, in some embodiments, all $T_i^{f+}$ and $T_i^{s+}$ values over all cells could be determined simultaneously using a solver, for example, Gauss-Seidel iteration, to determine temperatures at each time step. The explicit approach has the advantage of great simplicity; however, it only converges to a sensible result if sufficiently small time steps are used. The implicit method has the advantage that it will converge regardless of time-step size and therefore, since larger time steps can be used, the total solution time may be less.

Figure 5:
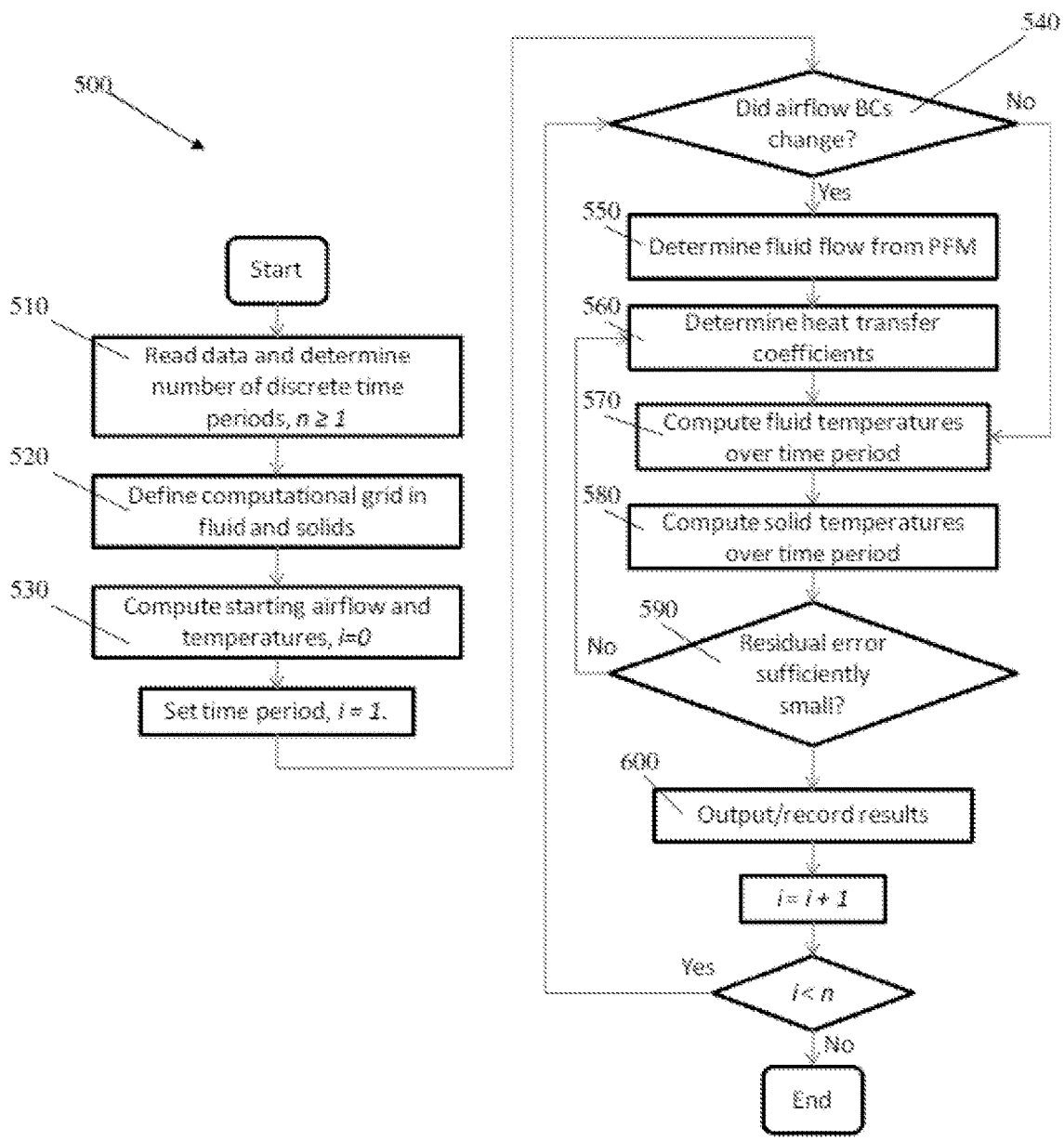
FIG. 5 is a flowchart of a process in accordance with one example.

The steps in an embodiment of the CPFM for transient applications is shown in a flowchart, indicated generally at 500 in FIG. 5. In this method, acts 510, 520, and 530 are similar to acts 410, 420, and 430 of flowchart 400. Act 510 includes an additional act of determining a number of time periods over which to perform the transient analysis. A greater number of shorter time periods may provide more accurate results than a lesser number of longer time periods. Acts 560, 570, 580, 590, and 600 of flowchart 500 are similar to acts 440, 450, 460, 470, and 480, respectively of flowchart 400. Flowchart 500 includes a decision act 540 where it is determined whether an event causes the airflow Boundary Conditions (BCs) to change. If so, the altered fluid flows are calculated in act 550 before proceeding to calculate the new fluid and solid temperatures for the associated time period. Acts 540-600 are repeated for each time period. In some embodiments, the results may be output (act 600) after the completion of the analysis for all time periods.

With the transient process, airflow patterns, and subsequently temperatures, may have to be recomputed several times depending on the number of transient events. If a transient event causes the airflow BCs to change, for example, a fan is shut off, then airflow patterns may be recalculated; however, if the transient event is limited to a power or temperature change, for example, a component starts dissipating additional heat, then only temperatures need be recalculated.

Example

Figure 6:
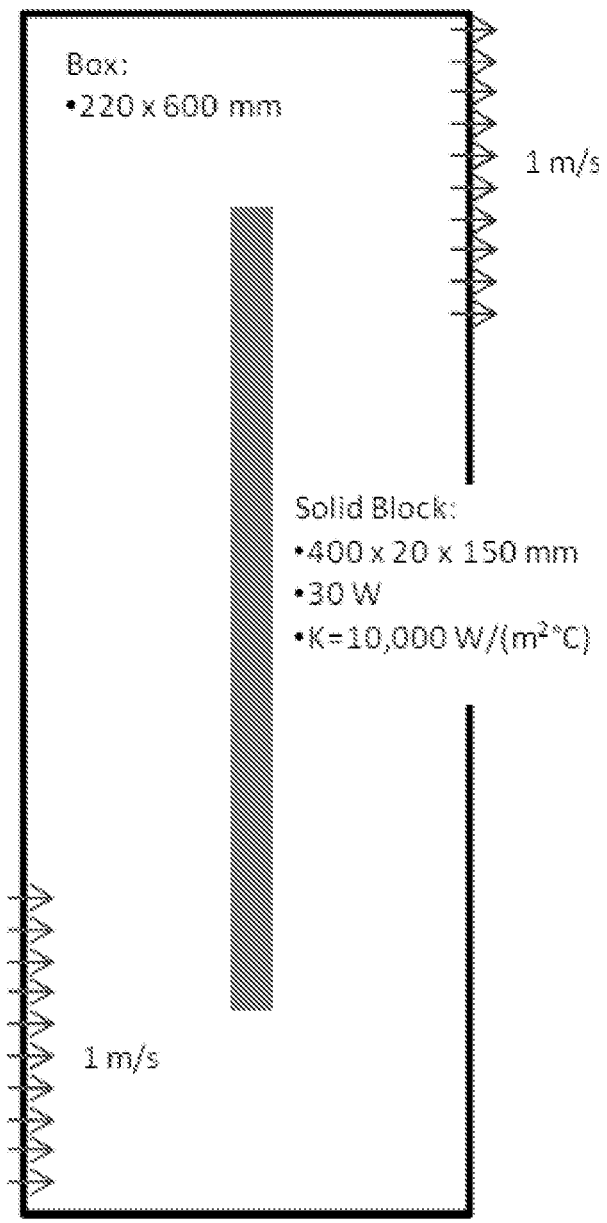
FIG. 6 is a diagram of a heated solid block cooled by a flow of air.

Consider the 2D steady-state airflow over a heated solid block as shown in FIG. 6. For purposes of distributing the 30 W dissipated by the block, the entire system is assumed to be 150 mm deep in the direction into the paper. This configuration could represent, for example, an electronics-thermal application where the primary goal is to determine the temperature of the heated solid block, which could represent a printed circuit board covered with heat-dissipating components. In this simple example, the block is uniformly heated and has a fairly high thermal conductivity so that, in equilibrium, all parts of the block will largely attain a single uniform temperature. In addition to predicting the block temperature, it is desired to also predict the airflow pattern surrounding the block and the temperature of the air everywhere within the enclosure.

The calculation of velocities and temperatures in the fluid follows the PFM approach described in, for example, the '605 application. To couple the solid-conduction and fluid-convection solutions, it is desirable to accurately predict heat transfer at the fluid-solid boundary.

With the conjugate PFM (CPFM) approach, heat transfer at the fluid-solid boundary may be empirically computed. It is generally not necessary to predict the shape of the velocity or temperature profile close to the wall to a high level of detail. Instead, a heat transfer coefficient, h (for example, in units of $W/(m^{2\circ} C.)$), may be utilized to determine the heat transfer as a function of fluid velocities and temperatures near the boundary.

Figure 7:
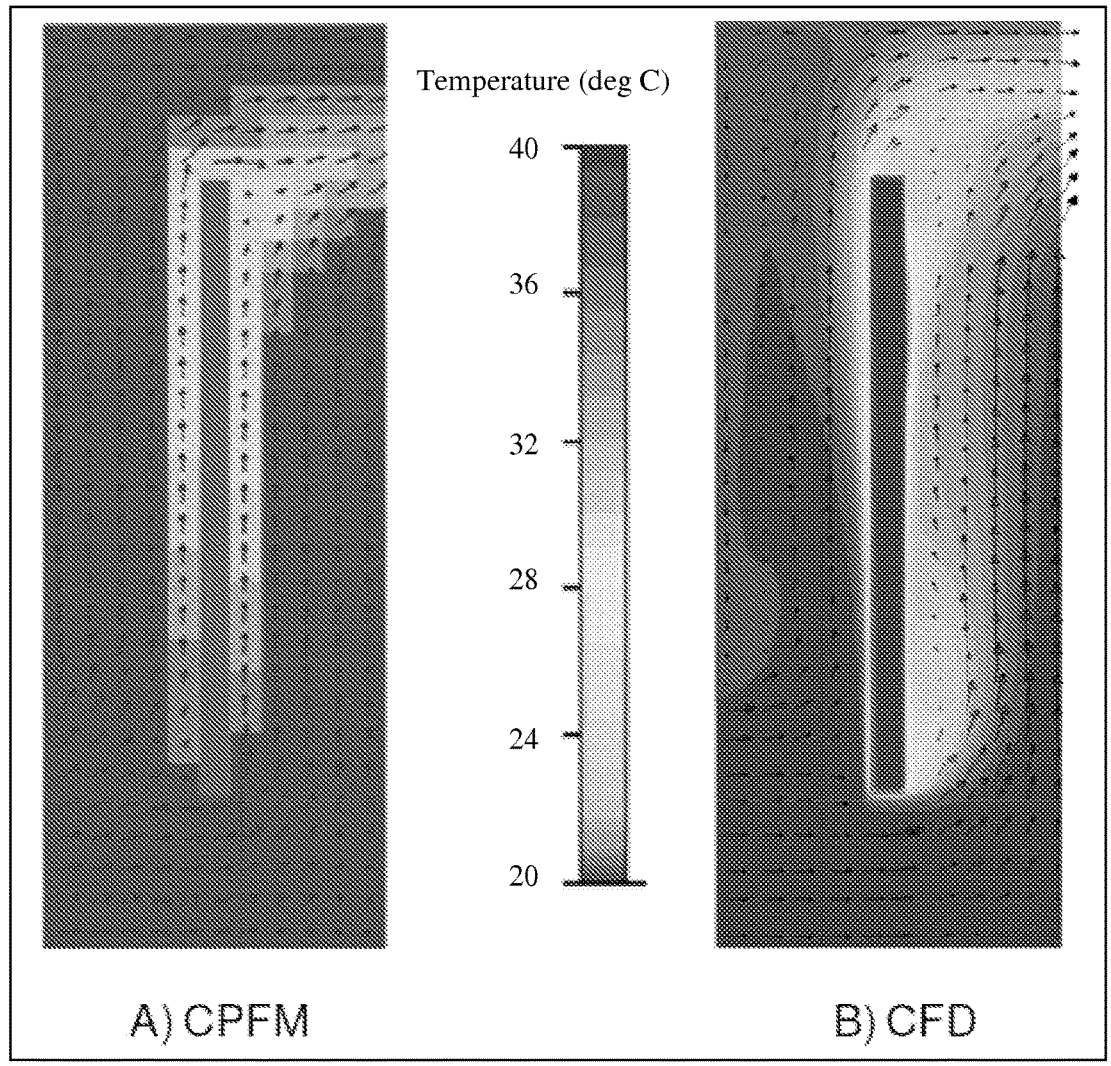
FIG. 7 is a comparison between the predicted airflow and temperature of the heated block of FIG. 6 as computed by a computational flow dynamics method and an embodiment of a method in accord with the present invention.

FIG. 7 shows a comparison of the airflow and temperatures from CFD and CPFM calculation methods for the Example of FIG. 6. In this example, the heat transfer coefficients for CPFM were taken from the CFD model. Although this virtually guarantees similar block temperature estimates, in theory, a very good library of hs can be compiled from CFD runs performed "offline."

Advantages of Conjugate PFM (CPFM)

The advantages of CPFM over CFD are similar to those of PFM over CFD as the time and effort of the problem is dominated by the airflow-solution portion not the conduction-solution portion. The advantages are related to speed, reliability, and simplicity of the model relative to CFD. The high-reliability of the method (i.e., it produces a reasonable result most or all of the time unlike CFD which frequently fails to converge) means that non-physical aspects of the numerical modeling like computational grid and convergence parameters may be hidden from the user. Consequently, such tools can be used by less sophisticated users with less training and support than full CFD and be made available more economically. CPFM tools can be used to analyze problems in seconds or minutes that take hours or days to solve in CFD.

The approach to handling turbulence in CFD and CPFM are markedly different. In CFD this may be handled in one of two ways: in laminar flow, the user has to be responsible to define enough computational grid cells so that the steep temperature gradient just on the fluid side of the interface is sufficiently resolved. This often requires grid cells on the order of 1 mm or smaller in the direction perpendicular to the solid surface and predictions are slow and highly grid dependent. When turbulence is selected by a CFD software user, a "wall function" may be employed. A wall function is an empirical expression for the shapes of the velocity and temperature profiles just on the fluid side of the interface. Because of the empiricism, the simulation is much less grid dependent and larger cells can be used to yield reasonable results. Unfortunately, CFD generally does not do a good job at handling regions in "transition," i.e., somewhere in the awkward state between fully laminar and fully turbulent flow and the quality of results are very CFD-code and application dependent and the user needs to decide a priori as to whether the flow is laminar or turbulent.

Since CPFM utilizes prescribed heat transfer coefficients to model heat transfer at fluid-solid boundaries the user never needs to decide if the flow is laminar or turbulent; this decision is made in the CPFM analysis automatically when the proper heat transfer coefficient is selected based on local flow conditions. Although CPFM is not nearly as sensitive to grid size as CFD, the issue of grid size in CPFM is largely irrelevant to the user. In some embodiments, an algorithm may generate a computational grid without any involvement with or even knowledge of the user.

As a result of the tremendous increase in simplicity and solution speed, CPFM tools can quickly analyze multiple design configurations and include optimization features that would be otherwise prohibitively slow in CFD based tools.

In embodiments above, processes and systems are provided that can determine relevant temperatures and air flows in electronic system in steady state conditions. The processes and systems may also determine changes in airflows and temperatures in an electronics system which may occur following a cooling system event which includes a change in heat produced (either an increase or decrease) by one or more components of the electronics system, or an initiation or disruption in operations of part or all of a cooling system. The systems and methods can be used to provide optimized design of electronics systems and other applications. As readily understood by one of ordinary skill in the art, in at least some embodiments, the air flow and/or temperature values determined are predictions for actual values that will occur for systems having the parameters modeled. In methods of at least one embodiment of the invention, after successful modeling of a cluster in a data center, the results of the model may be used as part of a system to order equipment, ship equipment and install equipment in a data center as per the designed layout.

In at least some embodiments of the invention discussed herein, the performance of assessments and calculations in real-time refers to processes that are completed in a matter of a few seconds or less rather than several minutes or longer as can happen with complex calculations, such as those involving typical CFD calculations.

In at least some embodiments described above, the design of an electronics system and/or actual parameters in an electronics system are altered based on predicted air flow. For example, a user of the design and management system may change the location of components and/or cooling apparatus that are used in the actual layout of equipment or the proposed layout of equipment in the electronics system. These alterations may be implemented to improve the cooling performance and/or may be implemented to provide cost and/or power savings when the performance is found to be within predetermined specifications. Further, based on determined airflow values, a data management system in accordance with one embodiment, may control one or more CRACs in a data center to adjust the airflow, and in addition, one or more equipment racks can be controlled to reduce power if the airflow is not adequate to provide sufficient cooling.

In at least some embodiments described above, tools and processes are provided for determining airflow in electronics systems. In other embodiments, the tools and processes may be used for other types of systems, for example, in mobile applications, including mobile data centers.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method for evaluating cooling performance of an electronics system, the system having a plurality of physical components including cooling consumers housed in a rack, and at least one cooling provider, the method comprising:
   receiving information related to physical structures of the electronics system;
   dividing the electronics system into a computational grid including a plurality of fluid cells and a plurality of solid cells, positions of the plurality of solid cells corresponding to positions of the physical components within the electronics system such that at least a portion of the plurality of solid cells defines a region within an interior of the physical components;
   determining air flow values for the plurality of fluid cells using a potential flow model analysis such that air flow values for the plurality of fluid cells are determined using airflow velocity potentials;
   controlling at least one of a physical component of the plurality of physical components and the at least one cooling provider based on the determined air flow values;
   for each fluid cell of the plurality of fluid cells, determining a temperature of the fluid cell by calculating heat transfer into the fluid cell from any adjacent fluid cells and from any adjacent solid cells, the calculation of heat transfer into the fluid cell from any adjacent fluid cell based at least in part on the determined air flow values;
   for each solid cell of the plurality of solid cells, determining a temperature of the solid cell by calculating heat transfer into the solid cell from any adjacent solid cells and heat transfer out of the solid cell into any adjacent fluid cells; and
   storing, on a storage device, the air flow values and the temperature of the fluid cell and the temperature of the solid cell.

2. The computer implemented method of claim 1, wherein determining one of the temperature of the fluid cell and the temperature of the solid cell includes using a heat transfer coefficient characterizing heat transfer from the solid cell to the liquid cell, wherein the heat transfer coefficient is derived from one of experimental results and previously conducted CFD analyses.

3. The computer implemented method of claim 2, wherein each of the plurality of fluid cells is a three-dimensional cell.

4. The computer implemented method of claim 3, wherein each of the plurality of solid cells is either a one dimensional cell or a two dimensional cell.

5. The computer implemented method of claim 2, wherein the determination of the temperature of each of the plurality of fluid cells and the determination of the temperature of each of the plurality of solid cells is performed for a plurality of contiguous time periods.

6. The computer implemented method of claim 5, further comprising modeling an effect of a thermal disruption in the electronics system during a time period subsequent to the thermal disruption on the temperature of at least a portion of the plurality of solid cells.

7. The computer implemented method of claim 6, further comprising determining modified air flow values which are maintained in the plurality of fluid cells throughout the time period subsequent to the thermal disruption.

8. The computer implemented method of claim 2, further comprising modifying a configuration of the physical structures of the electronics system based on one of the air flow values, the temperature of the fluid cell and the temperature of the solid cell.

9. A system for evaluating cooling performance of an electronics system, the system having a plurality of physical components including cooling consumers housed in a rack, and at least one cooling provider, the system comprising:
   an interface; and
   a controller coupled to the interface and configured to:
      receive information related to physical structures of the electronics system;

divide the electronics system into a computational grid including a plurality of fluid cells and a plurality of solid cells, positions of the plurality of solid cells corresponding to positions of the physical components within the electronics system such that at least a portion of the plurality of solid cells defines a region within an interior of the physical components;

determine air flow values for the plurality of fluid cells using a potential flow model analysis such that air flow values for the plurality of fluid cells are determined using airflow velocity potentials;

control at least one of a physical component of the plurality of physical components and the at least one cooling provider based on the determined air flow values;

for each fluid cell of the plurality of fluid cells, determine a temperature of the fluid cell by calculating heat transfer into the fluid cell from any adjacent fluid cells and from any adjacent solid cells, the calculation of heat transfer into the fluid cell from any adjacent fluid cell based at least in part on the determined air flow values;

for each solid cell of the plurality of solid cells, determine a temperature of the solid cell by calculating heat transfer into the solid cell from any adjacent solid cells and heat transfer out of the solid cell into any adjacent fluid cells; and store, on a storage device, the air flow values and the temperature of the fluid cell and the temperature of the solid cell.

10. The system of claim 9, wherein the controller is configured to determine one of the temperature of the fluid cell and the temperature of the solid cell using a heat transfer coefficient characterizing heat transfer from the solid cell to the liquid cell, wherein the heat transfer coefficient is derived from one of experimental results and previously conducted CFD analyses.

11. The system of claim 10, wherein the controller is configured to determine the temperature of each of the plurality of fluid cells and to determine the temperature of each of the plurality of solid cells for a plurality of contiguous time periods.

12. The system of claim 11, wherein the controller is further configured to model an effect of a thermal disruption in the electronics system during a time period subsequent to the thermal disruption on the temperature of at least a portion of the plurality of solid cells.

13. The system of claim 12, wherein the controller is further configured to model the effect of the thermal disruption on the temperature of at least a portion of the plurality of fluid cells.

14. The system of claim 10, wherein the interface is configured to provide for a user to modify a configuration of the physical structures of the electronics system.

15. A non-transitory computer readable medium having stored thereon sequences of instruction for evaluating cooling performance of an electronics system, the system including a plurality of physical components including cooling consumers housed in a rack, and at least one cooling provider, the sequences of instructions including instructions that will cause a processor to:

receive information related to physical structures of the electronics system;

divide the electronics system into a computational grid including a plurality of fluid cells and a plurality of solid cells, positions of the plurality of solid cells corresponding to positions of the physical components within the electronics system such that at least a portion of the plurality of solid cells defines a region within an interior of the physical components;

determine air flow values for the plurality of fluid cells using a potential flow model analysis such that air flow values for the plurality of fluid cells are determined using airflow velocity potentials;

control at least one of a physical component of the plurality of physical components and at least one cooling provider of the electronics system based on the determined air flow values;

for each fluid cell of the plurality of fluid cells, determine a temperature of the fluid cell by calculating heat transfer into the fluid cell from any adjacent fluid cells and from any adjacent solid cells, the calculation of heat transfer into the fluid cell from any adjacent fluid cell based at least in part on the determined air flow values;

for each solid cell of the plurality of solid cells, determine a temperature of the solid cell by calculating heat transfer into the solid cell from any adjacent solid cells and heat transfer out of the solid cell into any adjacent fluid cells; and store, on a storage device, the air flow values and the temperature of the fluid cell and the temperature of the solid cell.

16. The non-transitory computer readable medium of claim 15, wherein the instructions will cause the processor to determine one of the temperature of the fluid cell and the temperature of the solid cell using a heat transfer coefficient characterizing heat transfer from the solid cell to the liquid cell, wherein the heat transfer coefficient is derived from one of experimental results and previously conducted CFD analyses.

17. The non-transitory computer readable medium of claim 16, wherein the instructions will cause the processor to determine the temperature of each of the plurality of fluid cells and to determine the temperature of each of the plurality of solid cells for a plurality of contiguous time periods.

18. The non-transitory computer readable medium of claim 17, wherein the instructions will further cause the processor to model an effect of a thermal disruption in the electronics system during a time period subsequent to the thermal disruption on the temperature of at least a portion of the plurality of solid cells.

19. The non-transitory computer readable medium of claim 18, wherein the instructions will further cause the processor to model the effect of the thermal disruption on the temperature of at least a portion of the plurality of fluid cells.

20. The non-transitory computer readable medium of claim 15, wherein the instructions will cause the processor to modify a model of a configuration of the physical structures of the electronics system based on one of the air flow values, the temperature of the fluid cell and the temperature of the solid cell.

* * * * *